United States Patent
Soler et al.

(10) Patent No.: US 11,578,841 B2
(45) Date of Patent: Feb. 14, 2023

(54) COLOR SEPARATION LIGHTING DEVICES

(71) Applicant: Biological Innovation and Optimization Systems, LLC, Carlsbad, CA (US)

(72) Inventors: Robert Soler, San Marcos, CA (US); Eric Schafer, Carlsbad, CA (US); Erica Voss, San Diego, CA (US); Michael Phillips, New York, NY (US); Duncan Jackson, Holland, MI (US)

(73) Assignee: Biological Innovation and Optimization Systems, LLC, Carlsbad, CA (US)

( * ) Notice: Subject to any disclaimer, the term of this patent is extended or adjusted under 35 U.S.C. 154(b) by 299 days.

(21) Appl. No.: 16/591,444

(22) Filed: Oct. 2, 2019

(65) Prior Publication Data

US 2020/0332969 A1    Oct. 22, 2020

Related U.S. Application Data

(60) Provisional application No. 62/835,150, filed on Apr. 17, 2019.

(51) Int. Cl.
   *F21K 9/65*     (2016.01)
   *F21K 9/68*     (2016.01)
   (Continued)

(52) U.S. Cl.
   CPC .............. *F21K 9/65* (2016.08); *F21K 9/66* (2016.08); *F21K 9/68* (2016.08); *F21V 3/0625* (2018.02);
   (Continued)

(58) Field of Classification Search
   CPC ........ H05B 45/20; H05B 33/08; H05B 33/14; H05B 47/10; H05B 45/10; H05B 47/16; H05B 47/19
   (Continued)

(56) References Cited

U.S. PATENT DOCUMENTS 9,310,029 B2    4/2016    Kim
9,312,247 B2    4/2016    Lee et al.
(Continued)

FOREIGN PATENT DOCUMENTS

KR    20090015928 A    2/2009
KR    20140057827 A    5/2014
(Continued)

OTHER PUBLICATIONS

Author: E.Fred Schubert, Light emitting diodes, pp. 1-436, Date:Dec. 2006 (Year: 2006).*
(Continued)

*Primary Examiner* — Wei (Victor) Y Chan
(74) *Attorney, Agent, or Firm* — MLO, a professional corp.

(57) ABSTRACT

Lighting apparatuses include an enclosure around first and second light engines. The enclosure has a diffuser over first, second and third regions. The first and second regions are separated by the third region; a first light spectrum is emitted from the first region; a second light spectrum is emitted from the second region; and a mixture of the spectrums is emitted from the third region. In some embodiments, the first spectrum has a CCT≥7000K; the second spectrum has a CCT≤6500K. In some embodiments, the first spectrum has a first CCT≥3500K; the second spectrum has a second CCT≤6500K; the second CCT<first CCT and the difference between the CCTs is at least 1000K. In some embodiments, the first spectrum has a color bounded by a first set of chromaticity coordinates, and the second spectrum has a color bounded by a second set.

24 Claims, 30 Drawing Sheets

(51) Int. Cl.
*F21V 3/06* (2018.01)
*F21V 9/02* (2018.01)
*F21K 9/66* (2016.01)
*H05B 45/10* (2020.01)
*H05B 47/16* (2020.01)
*F21Y 113/13* (2016.01)
*F21Y 115/10* (2016.01)

(52) U.S. Cl.
CPC ............ *F21V 9/02* (2013.01); *H05B 45/10* (2020.01); *H05B 47/16* (2020.01); *F21Y 2113/13* (2016.08); *F21Y 2115/10* (2016.08)

(58) Field of Classification Search
USPC ........ 362/555, 231, 235, 558, 600, 607, 800
See application file for complete search history.

(56) References Cited

U.S. PATENT DOCUMENTS

| | | | |
|---|---|---|---|
| 9,951,909 B2* | 4/2018 | Progl | F21K 9/232 |
| 2004/0212314 A1 | 10/2004 | Nevins | |
| 2006/0289878 A1 | 12/2006 | Brunner et al. | |
| 2012/0319565 A1 | 12/2012 | Sakuta et al. | |
| 2013/0002157 A1* | 1/2013 | van de Ven | H05B 45/60 |
| | | | 315/192 |
| 2014/0029264 A1* | 1/2014 | Tai | F21V 13/04 |
| | | | 362/307 |
| 2014/0049172 A1 | 2/2014 | Bakk | |
| 2014/0252967 A1* | 9/2014 | van de Ven | H05B 45/20 |
| | | | 315/188 |
| 2014/0285088 A1 | 9/2014 | Windisch | |
| 2016/0076706 A1 | 3/2016 | Rebman et al. | |
| 2017/0354000 A1* | 12/2017 | Gordin | H05B 45/20 |
| 2018/0043130 A1* | 2/2018 | Moore-Ede | H05B 47/105 |
| 2018/0076181 A1* | 3/2018 | Onuma | H01L 25/0753 |
| 2018/0216791 A1* | 8/2018 | Leung | F21K 9/61 |
| 2018/0259140 A1 | 9/2018 | Keller et al. | |

FOREIGN PATENT DOCUMENTS

| | | |
|---|---|---|
| WO | 1996015649 A1 | 5/1996 |
| WO | 2007114614 A1 | 10/2007 |
| WO | 2007104309 A3 | 11/2007 |
| WO | 2016171932 A1 | 10/2016 |
| WO | 2016184852 A1 | 11/2016 |
| WO | 2017144303 A1 | 8/2017 |
| WO | 2018041505 A1 | 3/2018 |

OTHER PUBLICATIONS

Dai et al., "Spatial and spectral illumination design for energy-efficient circadian lighting," Science Direct, vol. 146, Dec. 2018.
International Search Report dated Jul. 6, 2020 for PCT Patent Application No. PCT/IB2020/052642.
European Search Report dated Dec. 15, 2022 for European Patent Office Patent Application No. 20791166.0.

* cited by examiner

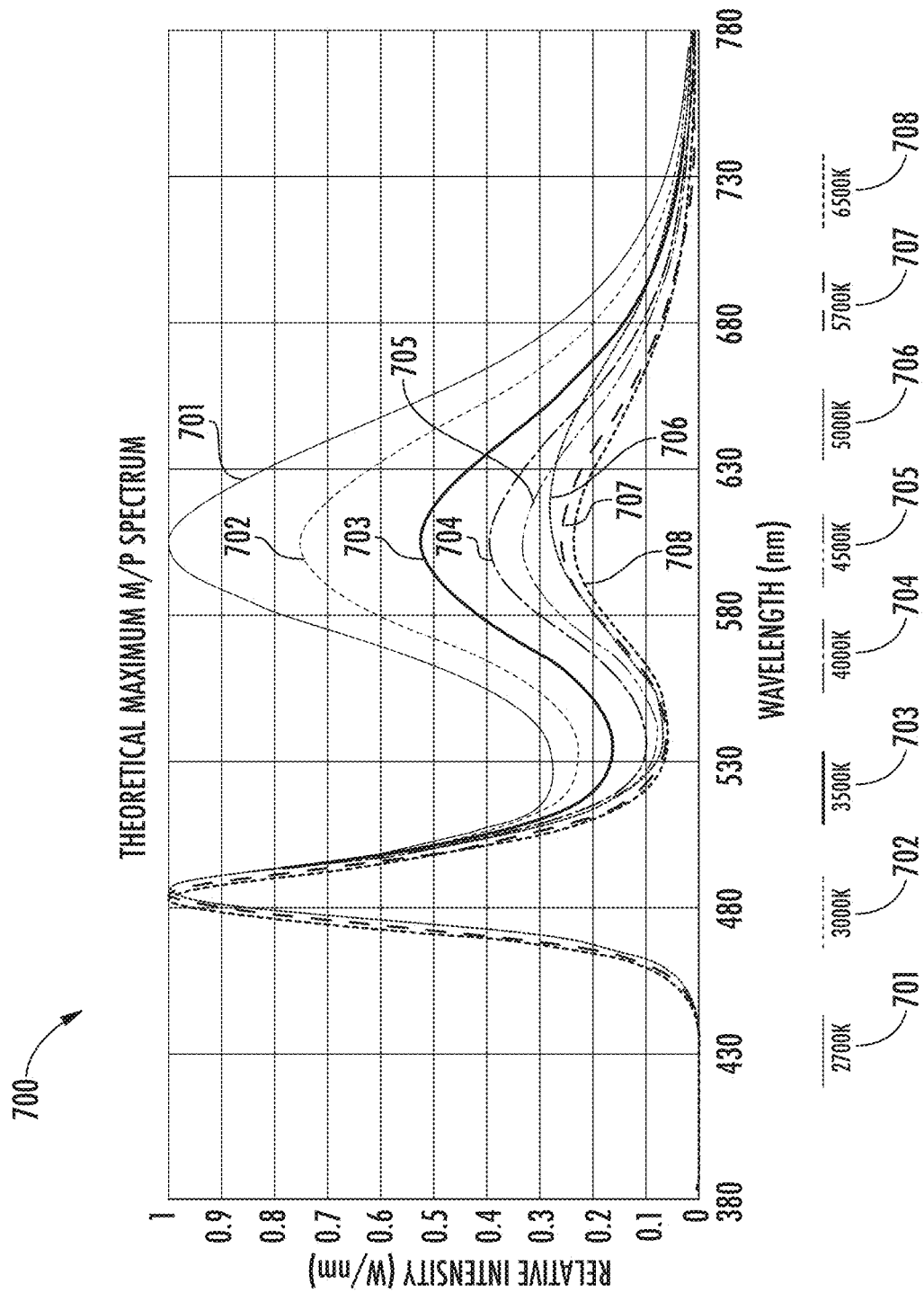

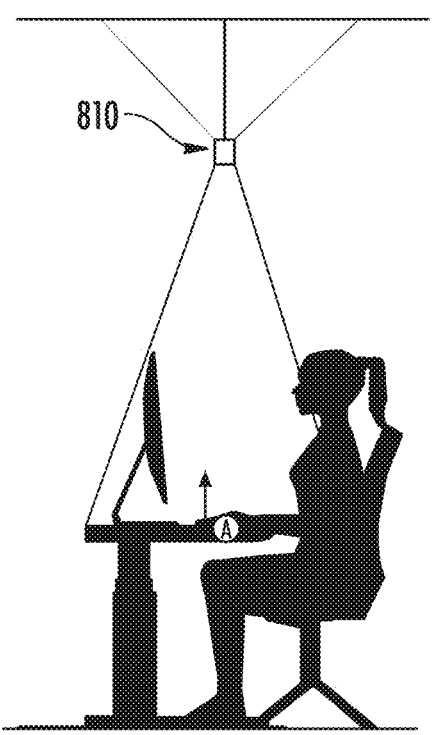 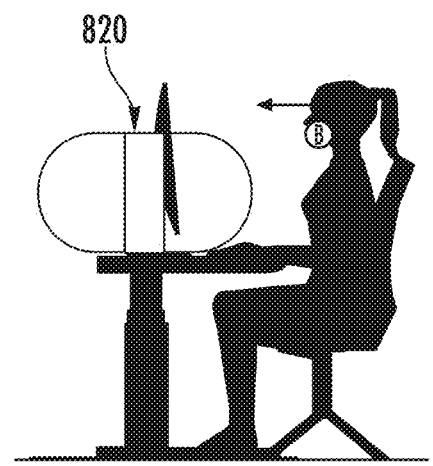
FIG. 8A
(PRIOR ART)
FIG. 8B
(PRIOR ART)

COLOR SEPARATION LIGHTING DEVICES

RELATED APPLICATIONS

This application claims priority to U.S. Provisional Application No. 62/835,150, filed on Apr. 17, 2019 and entitled "Color Separation Lamp"; which is hereby incorporated by reference in its entirety.

BACKGROUND

Retinal ganglion cells (RGC) take neurotransmitter information from the inner and outer layers of the retina and potentiate action firing potentials to the visual cortex of the brain. Approximately 1% of RGCs contain an intrinsic photopigment melanopsin, with peak in vivo sensitivity at around 490 nm. These intrinsically photosensitive retinal ganglion cells (ipRGCs) project information to different portions of the brain and contain signals from both melanopsin and rods and cones. These ipRGCs mediate physiological effects of light beyond just vision.

There are multiple subtypes of ipRGCs, classified by dendrite morphology. Each subtype appears to mediate a different physiological effect. Some of these effects are direct and some are indirect. An example of a direct effect is melatonin suppression, where light will instantaneously suppress melatonin with exposure. An example of an indirect effect is circadian alignment, in which circadian rhythms will align in response to a whole day's light exposure, not just a single short duration of light exposure. The resulting circadian shift from this light exposure will present itself on the following day.

Melanopsin is a type of photopigment belonging to a larger family of light-sensitive retinal proteins called opsins and is found in ipRGCs of humans and other mammals. Melanopsin plays an important non-image-forming role in the photoentrainment of circadian rhythms as well as potentially many other physiologic functions. Stimulation of melanopsin-containing ipRGCs contributes to various reflexive responses of the brain and body to the presence of light. Melanopsin photoreceptors (OPN4) are sensitive to a range of wavelengths and reach peak light absorption at wavelengths around 480-500 nanometers (e.g., 490 nm). Melanopic light, that is light corresponding to the melanopsin action spectrum, including particularly the wavelengths in the 480-500 nm region, is important for non-visual stimuli including physiological and neurological effects such as pupillary light reflex and circadian entrainment and/or disruption. Time-coordinated exposure, including over-exposure and under-exposure to melanopic light, can be used to entrain and facilitate healthy circadian rhythms in humans and other mammals.

Circadian related photoreceptors are located throughout the retina. However, subtypes may be located in different regions within the retina. This has been evidenced by direction-dependent physiological effects, such as melatonin suppression. Melatonin related photoreceptors are most sensitive in the lower hemisphere of the retina. Selective stimulation of these photoreceptors is possible by directing illumination, and specifically melanopic light, towards or away from the region of the retina where ipRGC subtypes are most concentrated or most sensitive or responsive in order to mediate a specific physiological response. Equivalent Melanopic Lux (EML) is a metric for measuring the biological effects of light on humans. EML as a metric is weighted to the ipRGCs response to light and translates how much the spectrum of a light source stimulates ipRGCs and affects the circadian system. Melanopic ratio is the ratio of melanopic lux to photopic lux for a given light source.

The variation of the intensity of light output has a relatively straightforward and understandable effect. Namely, higher or lower light intensities incident on the human visual system provide greater or lesser biological stimulation respectively (e.g., with respect to circadian rhythms), and the combination of both color variation (e.g., via spectral tuning) and intensity variation can create complementary, and in some cases, synergistic biological effects. However, spatial distribution is a factor that adds a great deal of complexity and potential cost to lighting design. Scientific studies have shown that light emanating from above the horizon has high biological significance, related to melatonin suppression, compared with light coming from below the horizon. One consequence of this finding is that illumination emanating (e.g., reflecting) from above (e.g., from upper portions of walls and ceilings) has a higher biological significance compared to light emanating from below (e.g., from desktops and tabletops). This difference in biological effect is due at least in part to the fact that there is a greater concentration or sensitivity of ipRGC subtypes related to melatonin suppression in the lower hemisphere of the human retina than in the upper hemisphere. Thus, the biological effect of light impacting the lower hemisphere of the retina may be greater than the biological effect of the same light incident on the upper hemisphere.

Many systems exist for attempting to provide proper daytime cues for circadian entrainment (synchronization), such as light therapy devices or general lighting systems that simulate natural sunlight. Light therapy boxes are typically aimed at a user's eyes for intense exposure over a short duration. While these light therapy boxes have proven to be effective, compliance of use is generally very low due to various reasons including lack of comfort, time required to use, and the invasive nature of a large dedicated light therapy box. Some light therapy apparatuses include a diffusing surface to reduce the intensity and make the illumination more comfortable for the user. General lighting systems, such as ceiling lights and skylights, are also used to provide biological light for circadian entrainment, typically through indirect lighting such as light reflecting off walls. Thus, these lighting systems are designed to supply biological light for the overall space of the room in which they are installed.

SUMMARY

In some embodiments, a lighting apparatus has a first light engine, a second light engine and an enclosure around the first light engine and the second light engine. The first light engine produces a first light spectrum having a first correlated color temperature (CCT) greater than or equal to 7000 K. The second light engine produces a second light spectrum having a second CCT less than or equal to 6500 K. The enclosure has an optical diffuser, where the optical diffuser is positioned over a first region, a second region and a third region of the enclosure. The first region and the second region are separated by the third region. The first light spectrum is primarily emitted from the first region of the enclosure. The second light spectrum is primarily emitted from the second region of the enclosure. A mixture of the first light spectrum and the second light spectrum is emitted from the third region of the enclosure.

In some embodiments, a lighting apparatus has a first light engine, a second light engine and an enclosure around the first light engine and the second light engine. The first light engine produces a first light spectrum having a first correlated color temperature (CCT) greater than or equal to 3500 K. The second light engine produces a second light spectrum having a second CCT less than or equal to 6500 K, where the second CCT is less than the first CCT and the difference between the first CCT and the second CCT is at least 1000 K. The enclosure has an optical diffuser, where the optical diffuser is positioned over a first region, a second region and a third region of the enclosure. The first region and the second region are separated by the third region. The first light spectrum is primarily emitted from the first region of the enclosure. The second light spectrum is primarily emitted from the second region of the enclosure. A mixture of the first light spectrum and the second light spectrum is emitted from the third region of the enclosure.

In some embodiments, a lighting apparatus has a first light engine, a second light engine and an enclosure around the first light engine and the second light engine. The first light engine produces a first light spectrum having a first color in a first area bounded by chromaticity coordinates (x,y) of (0.11, 0.1), (0.16, 0.004), (0.255, 0.33), (0.32, 0.325) in a CIE 1931 color space diagram. The second light engine produces a second light spectrum having a second color in a second area bounded by chromaticity coordinates of (0.55, 0.44), (0.691, 0.311), (0.417, 0.45), (0.35, 0.35) in the CIE 1931 color space diagram. The enclosure has an optical diffuser, where the optical diffuser is positioned over a first region, a second region and a third region of the enclosure. The first region and the second region are separated by the third region. The first light spectrum is primarily emitted from the first region of the enclosure. The second light spectrum is primarily emitted from the second region of the enclosure. A mixture of the first light spectrum and the second light spectrum is emitted from the third region of the enclosure.

BRIEF DESCRIPTION OF THE DRAWINGS

FIGS. 7A-7C are graphs showing theoretical maximum amounts of melanopic light that can be produced for different color temperatures.

FIGS. 8A-8B are diagrams illustrating horizontal and vertical illuminance, respectively, as is known in the art.

DETAILED DESCRIPTION

People who spend a significant portion of time indoors during the day can be deprived of exposure to natural sunlight that provides circadian regulation to humans. Although artificial lighting systems exist for providing circadian entrainment, the spectra provided by these conventional systems—typically ceiling lights—often are deficient in the melanopic region (blue, particularly 480 nm to 500 nm). Also, ceiling lights primarily illuminate horizontal surfaces (i.e., tabletops), and do not provide sufficient light in the vertical plane which is beneficial for circadian entrainment. Indirect lighting can be used to reflect light off of walls toward a user's eyes, but indirect lighting is only effective when walls are close enough to one another to sufficiently reflect the light to the user. Thus, indirect lighting has less effect in open plan offices or large spaces. Other options to solve the spectral problem include either providing cold white light or spectrally optimized light. Yet, customizing the spectra does not ensure that the light is effectively reaching the user's eyes. Increasing the brightness of lighting significantly, such as through use of light therapy boxes, can provide a sufficient daytime light cue. However, high brightness is very intrusive and cannot be used comfortably for extended periods of time, such as over an entire workday. Accordingly, it may be desirable to have more individualized exposure than a full environment. Furthermore, a more individualized exposure may be more energy efficient in some applications.

In the present disclosure, lighting apparatuses are disclosed that deliver high melanopic flux in a manner such that the emitted light is efficiently received by a recipient's eyes, while being aesthetically pleasing and without causing visual fatigue. Embodiments of lighting devices utilize two distinct colors of light placed separate from one another, with a diffuser creating a mixture of the colors in between the two separate regions. This color separation in combination with a mixture (e.g., a gradient) in between creates a unique effect that makes colors appear warmer and thus more acceptable for the end user, consequently providing a high melanopic flux per visual stimulus (melanopic to photopic ratio, "M/P ratio"). Furthermore, the light emitted spatially upward from the lighting apparatus—that is, above a horizon region relative to the user's face—is of a colder color temperature than the light emitted spatially downward. The colder color temperature light has capacity for much higher M/P ratio, which provides optimal stimulation of melanopsin-related photoreceptors in the lower hemisphere of the retina (e.g., by direct illumination or by light bouncing off a ceiling or wall).

Figure 1:
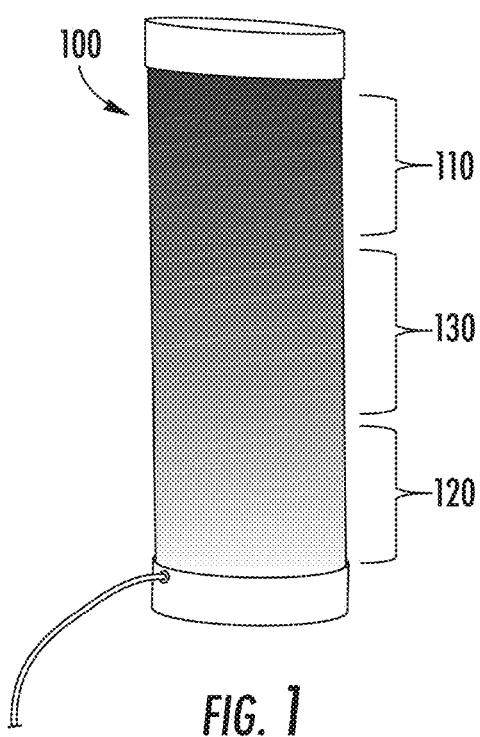
FIG. 1 is a perspective view of a color separation lamp, in accordance with some embodiments.

FIG. 1 shows a perspective view of an example embodiment of a lighting apparatus 100 in which color-separated light is emitted, providing biological lighting directed toward the face of the user. The lighting apparatus 100 has a first region 110 that emits bluish melanopic light, a second region 120 that emits warm light, and a third region 130 between the first and second regions in which the bluish light and warm light are mixed. The first region 110 is above the third region 130 (relative to the ground), and the second region 120 is below the third region 130. Thus, the lighting apparatus 100 emits bluish light in an upper first region and warm light in a lower second region, where the first and second regions are separated from each other by a third region. Both colors are emitted toward the user, with the blue light being positioned in the upper region of the lamp to simulate blue sky of natural lighting. The lighting provides a comfortable brightness level and an aesthetically pleasing spectrum to the user.

In the embodiment of FIG. 1, the lighting device 100 is a table lamp with the third region 130 designed to be aligned with the user's face to deliver light directly toward a user's eyes. However, in other embodiments this third "horizon" region does not need to be aligned with the user's face. For example, embodiments may be configured as a ceiling fixture where the color separation lighting effect is achieved indirectly by reflecting off the walls of a room.

Conventionally, emitting light at the face of the user is not desirable, as it will cause glare. In particular, blue light tends to cause more glare than other colors. However, the color separation utilized in the present embodiments provides a surprising aesthetic acceptability by users and also visually replicates outdoor natural lighting (e.g., blue sky and warmer light toward the horizon). The spectral power distributions of the present lighting devices also provide ultra-high amounts of melanopic light (e.g., M/P ratio >1 or >1.2 or >1.3).

The lighting devices of the present disclosure deliver a high amount of vertical illuminance to the viewer's eyes, either directly or indirectly, thus providing a significant physiological impact. At the same time, the color separated light creates a unique effect where the overall perceived color temperature from the lighting apparatus is aesthetically acceptable even though the biological lighting directed at the viewer's face is colder in color temperature. Delivery of a high amount of biological light toward a user's eyes is counter-intuitive to conventional practices where colder colors are typically less acceptable aesthetically, and conventional lighting fixtures are often designed to direct light downward, avoiding light in the eyes in order to prevent glare.

Insights behind the color separation concepts of the present embodiments, and the wavelengths and colors used to produce the desired physiological and visual effects, shall now be described.

In this disclosure, "lighting apparatus" shall refer to lighting devices such as, not but limited to, lamps (e.g., task lamps, table lamps, decorative lamps), ceiling-mounted fixtures, devices emitting light from a the entire surface of vertical panel (e.g., a wall) or other types of lighting fixtures. A "light engine" refers to a lighting source capable of producing one or more spectral power distributions, such as a light emitting diode (LED) or an LED board with one or more LEDs. The term "LED boards" may also be referred to in this disclosure as a circuit board or a chip or simply a light emitting diode (LED), and can contain one or more individual LEDs. A person who will be receiving light from a lighting apparatus shall be referred to as a user, end user, viewer, occupant, or observer. Characteristics of light emitted from a particular region of a light apparatus shall be referred to as, for example, a correlated color temperature (CCT) or light spectrum, while the characteristics of total light emitted from the full lighting apparatus shall be referred to as "overall" or "integrated," such as an integrated CCT or integrated spectrum. These overall or integrated characteristics represent the total light combined from all the sources of the lighting apparatus, as received by a user at the user's location. The user's location is the position of the user relative to the lighting apparatus, in which the light is received by the user's eyes when the light is in its intended installation orientation. For example, at the user's location the lighting apparatus may be near or above the user's eye level, or near or above the user's primary viewing area (area that the user is intending to look at). In another example, the mixed-light gradient region may be approximately at eye level with user (i.e., observer), or near or above eye level, or near or above the user's primary viewing area. The user's location relative to the lighting apparatus will depend on the type of fixture and the use-case for the lighting fixture (e.g., task lamp on a desk, table lamp, ceiling-mounted fixture, wall-mounted fixture, nightstand lamp, or other).

Color Perception and Biological Light

As mentioned above, ipRGCs mediate physiological effects of light beyond just vision. However, these physiological responses require greater amounts of light than what is required by vision. A melanopic to photopic (M/P) ratio refers to the melanopic flux of light relative to the photopic visual stimulus. Thus, it would be beneficial to balance these physiological effects with the visual effects by creating a M/P ratio greater than 1.

Known physiological effects mediated by ipRGCs include melatonin suppression, acute alertness, circadian alignment, body temperature, cognition and mood. Each ipRGC subtype utilizes a different proportion of cone contributions and melanopsin expression. These cone contributions can be combined with melanopsin to skew the peak sensitivity to be slightly different than 490 nm. For example, melatonin suppression has been shown to have a peak sensitivity near 465 nm, suggesting the blue cone with in vivo peak sensitivity between 430 and 450 nm has skewed the peak sensitivity of this ipRGC subtype. On the other hand, circadian alignment has been shown to have a peak sensitivity closer to 490 nm, suggesting that melanopsin is the main contributor. Each of these sensitivities may be altered with duration and intensity of light exposure. However, all known sensitivities occur in the range between 450-500 nm, known as blue light. Thus, it would be very beneficial to create a light source that contains all wavelengths from 450-500 nm rather than pinpoint any single physiological effect.

However, very blue-enriched light sources such as ones with all wavelengths from 450-500 nm, resulting in cooler (higher) color temperatures, are generally not well received by people. This appears to be especially true for LED light sources. For example, the office lighting standard historically has been 4100 K for fluorescent lighting but is being replaced by 3500 K or 3000 K for LEDs (i.e., warmer color temperature LEDs than were used for fluorescent lights). In fact, in recent polling of designers, architects and engineers, the favorite color temperature preference is 3500 K followed by 3000 K and 4000 K. Moreover, a polling of which color temperatures are forbidden in designs were almost unanimously 5000 K and 6500 K.

Figure 2:
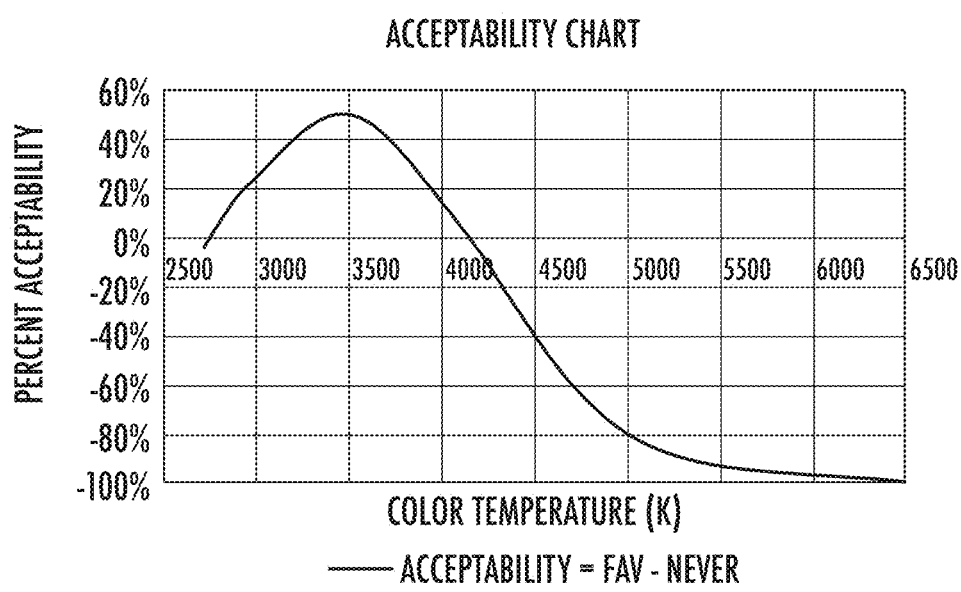
FIG. 2 is a graph of color acceptability versus color temperature, in accordance with some embodiments.

For example, FIG. 2 shows results of a study based on 200 participants that was done in relation to the present disclosure. FIG. 2 is a chart of color acceptability versus color temperature, where acceptability was rated based on the percentage of participants who chose a color temperature as their favorite subtracted by the percentage of participants who would never use a certain color temperature. Participants were allowed to have only a single answer for favorite but could have several answers for unacceptable color temperatures. The graph of FIG. 2 shows that 3500 K was the highest acceptable light source and 6500 K was the least acceptable light source. Similarly, a study was conducted on the productivity of workers under cold versus warm color temperatures. The results of the study showed higher productivity under cold color temperatures. These results were shared with the participants of the study. Despite the participants discovering that their productivity increased under blue-enriched light sources, the majority still chose to work under non-enriched light sources as these lights created a much more comfortable environment. Thus, the results indicate that it is imperative to provide the most melanopic content for each color temperature in order to achieve maximum benefit without compromising user preference on the perceived color.

Figure 3A:
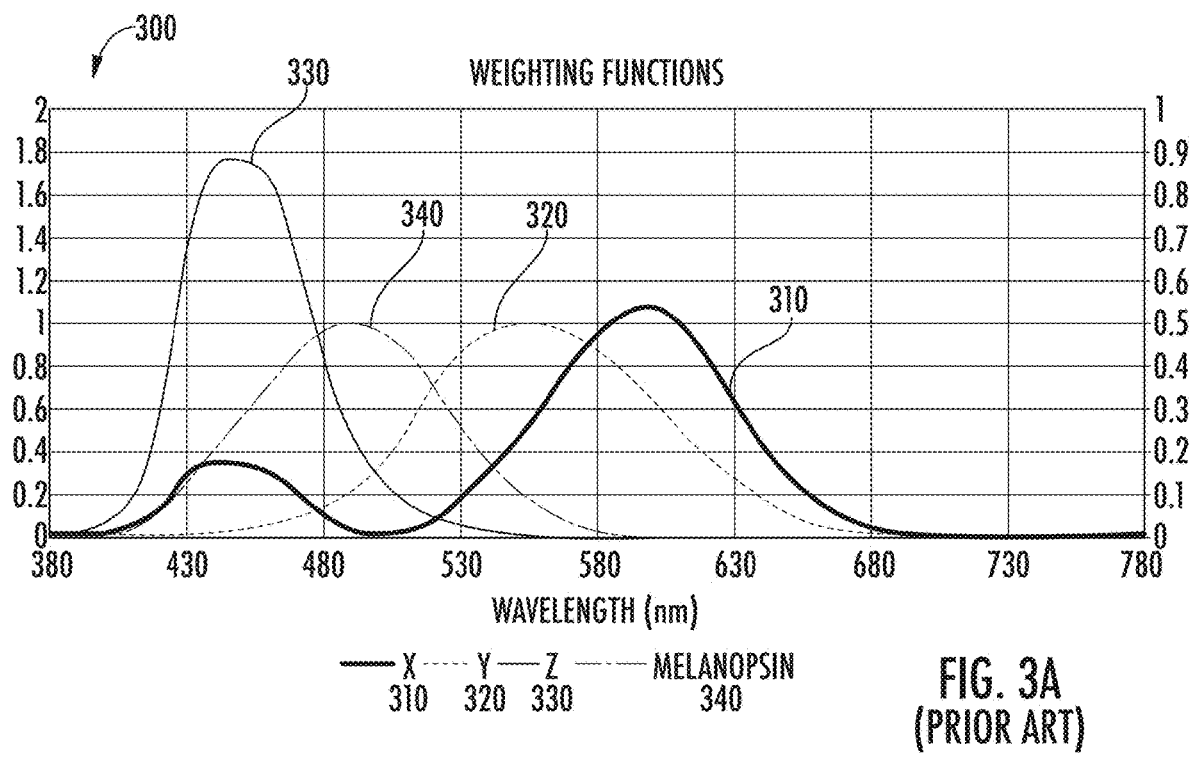
FIGS. 3A-3B are charts of color matching functions and the CIE 1931 color space diagram, as known in the art.
Figure 3B:
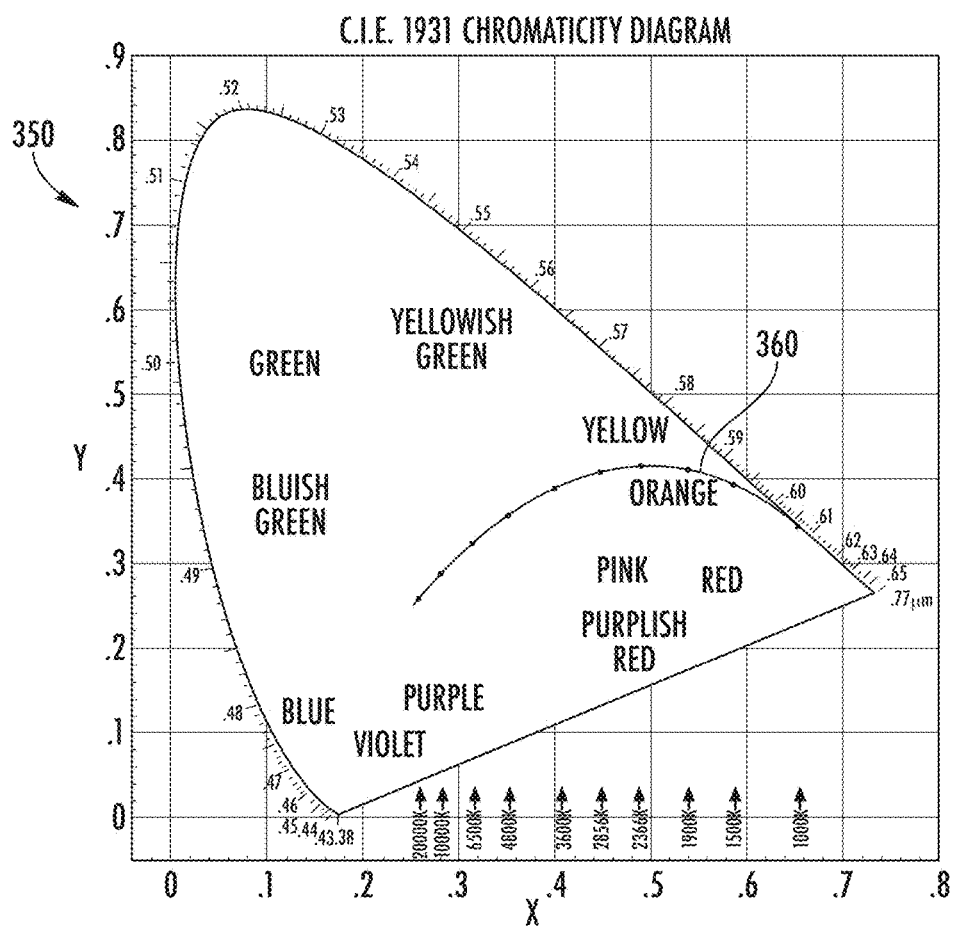

In order to achieve the best melanopic content per perceived blue color, the interaction between melanopsin and color vision was considered in the lighting devices of the present disclosure. Color vision is perceived by three color cones—red, green and blue. Color matching functions in graph 300 of FIG. 3A are known functions that are used to convert any spectral power distribution into a point (i.e., a color) on the CIE 1931 color space diagram 350 of FIG. 3B. FIG. 3A shows color matching functions X (curve 310), Y (curve 320), and Z (curve 330) that are used to convert any spectral power distribution into an (x,y) color point on the color space diagram 350 shown in FIG. 3B. In FIG. 3A, melanopsin weighting function 340 is also plotted. The left-hand y-axis scale is for the curves 310, 320 and 330, showing units relative to the Y-curve 320. The right-hand scale is for the melanopsin curve. Y (curve 320) also serves as the luminous efficiency function, which is analogous to brightness. The black body locus that defines white light is shown as curve 360 in FIG. 3B, where the x-axis in FIG. 3B is X-chromaticity values and the y-axis is Y-chromaticity values. Using a dot product of any spectra, the tristimulus values X, Y, and Z for a spectral power distribution (SPD) can be determined. This is then converted to (x,y) on the CIE 1931 color space (diagram 350) via the following equations:

$$x = \frac{X}{X+Y+Z} \quad \text{(Eq. 1)}$$

$$y = \frac{Y}{X+Y+Z} \quad \text{(Eq. 2)}$$

In terms of color seen by a viewer, having more Y will make the color appear more green but also add more lumens. Having more X will make the color appear more red, and having more Z will make the color appear more blue.

Figure 4:
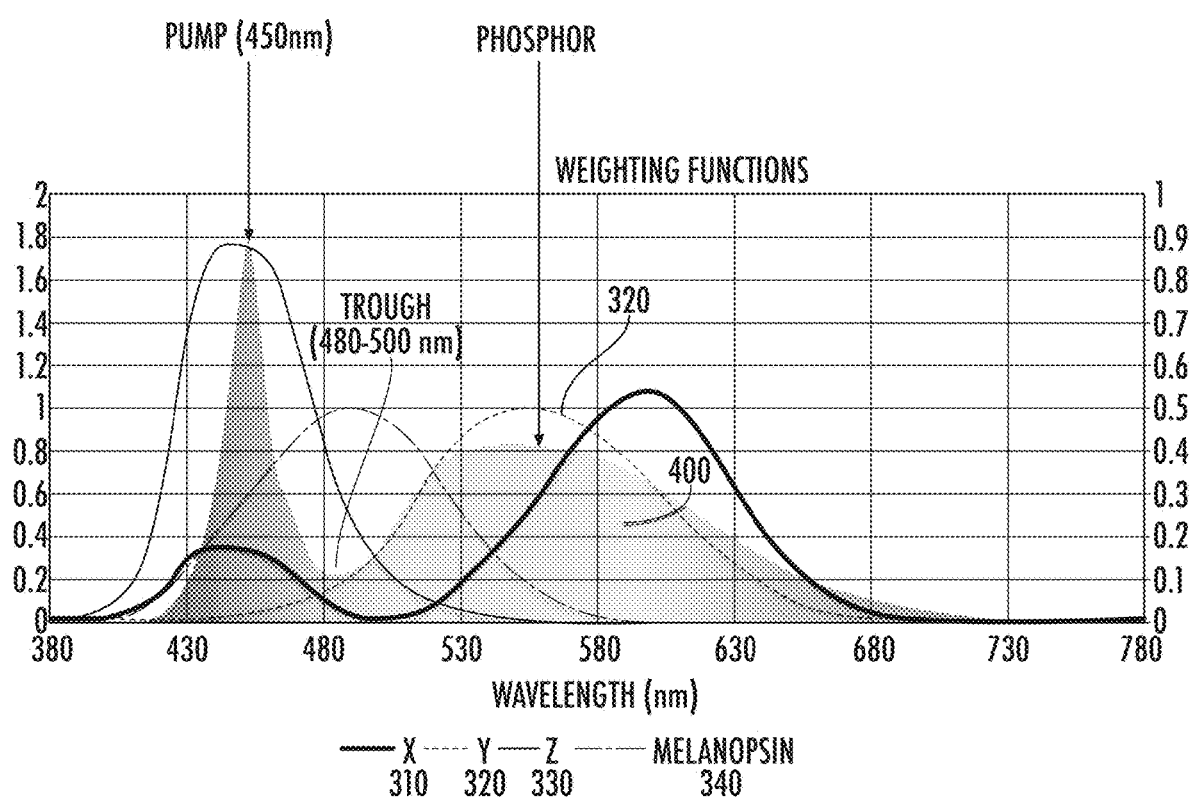
FIG. 4 shows a traditional white light LED spectrum, as known in the art.

FIG. 4 shows a traditional white light LED spectrum 400 overlaid on the color matching functions from FIG. 3A. The spectrum 400 generally has a narrow peak at 450 nm followed by a trough in the 480-500 nm region and a broad mound with a lot of energy around 550 nm. The peak at 450 nm is a blue LED "pump" aligned with the peak Z (i.e., blue sensitivity) that is used to excite a broad phosphor or phosphors. The phosphor has the majority of its weight around peak Y (of curve 320), as this will yield the most amount of lumens. In other words, because of the narrow peak at 450 nm and trough in the 480-500 nm range, a traditional white light LED has a low amount of blue light for any given color temperature and is unable to deliver significant melanopic light. In contrast, the lighting apparatuses of the present disclosure aim to maximize the melanopic component for any given color temperature.

The physical structure of conventional white light LEDs can also impair the ability to deliver melanopic light effectively. A phosphor white LED that produces the spectrum 400 is constructed by coating a blue LED with a phosphor. The thickness of the phosphor coating can vary between LEDs, and the thickness can also vary across the surface of an individual LED. When the phosphor thickness within an individual blue die is not uniform, the color of light can vary at different angles of the emitted light. This effect, known as "color over angle," is another challenge of producing consistent colors from LEDs and can also impair the ability to deliver melanopic light effectively. Visually, this color over angle effect causes gradients of color across a diffuser, and has been determined to be unacceptable by the industry. Thus, the lighting industry has largely solved this color over angle issue, eliminating any gradients of color across diffusers.

Figure 5:
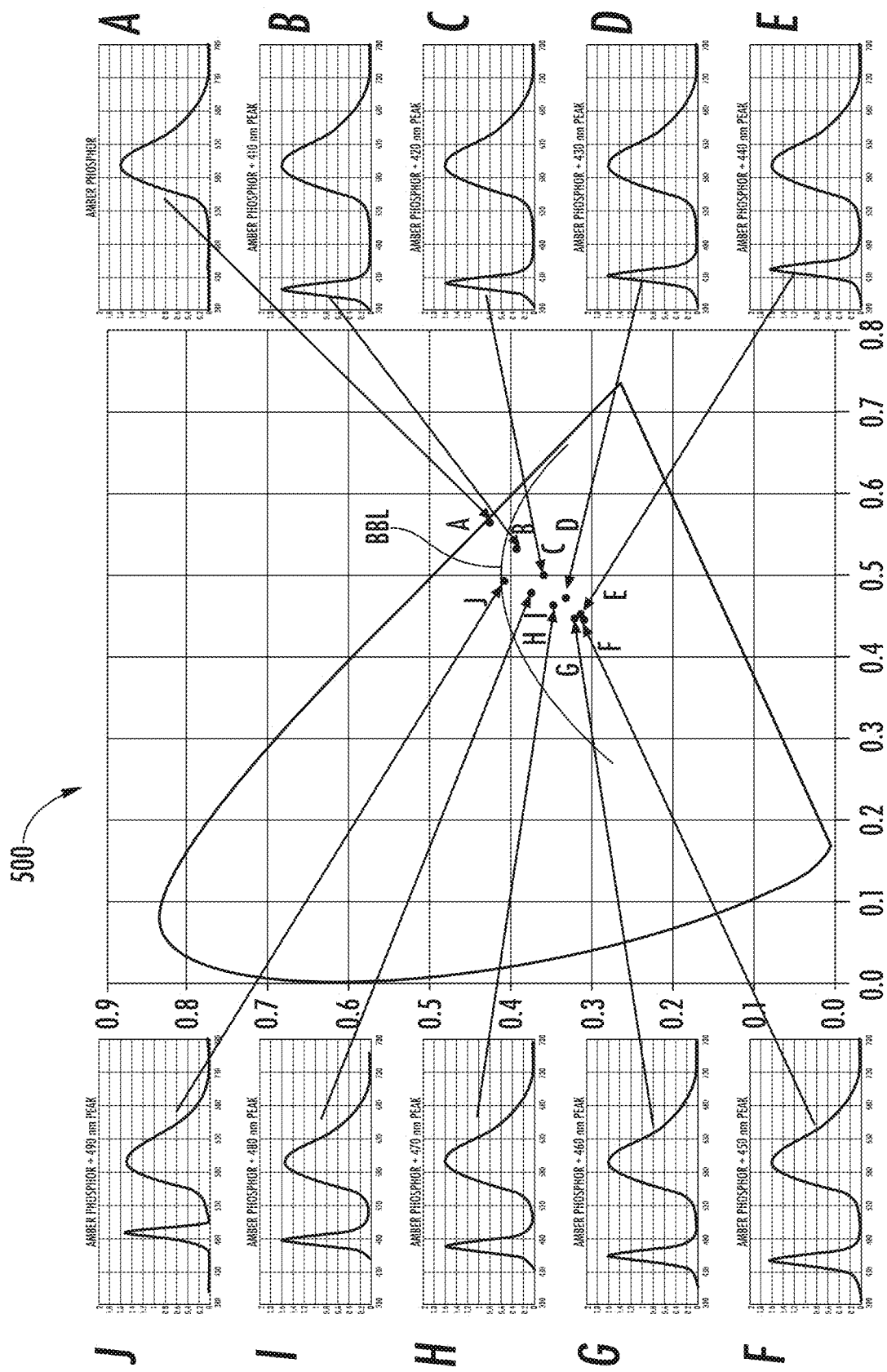
FIG. 5 is a graph of color point shifts due to addition of blue light, in accordance with some embodiments.

To efficiently deliver significant amounts of biological (e.g., melanopic 480-500 nm) light, the present disclosure uniquely recognizes the effect of different wavelengths of blue light on the color produced. FIG. 5 demonstrates how a blue light is used to shift a color point. Various amber phosphors with different wavelengths of blue LEDs are depicted by sub-graphs A-J, and the color points of each of these phosphor-LED combinations are then plotted on graph 500 in the CIE 1931 color space. First, sub-graph A is the spectrum of an amber phosphor without any blue LED, which results in color point A on graph 500. In sub-graph B the same amber phosphor as in sub-graph A is used, but with a 410 nm blue LED to shift the color point. The resulting color point is shown as point B in the CIE 1931 color space (graph 500), where the x-axis is X-chromaticity values and the y-axis is Y-chromaticity values. Thus, an amber phosphor color point is shifted with an LED with peak emission at 410 nm such that the peak-to-peak ratio is 1:1 (amber peak to blue peak), and the resulting color is shifted (point B relative to point A) towards the black body locus (BBL) that defines white light.

FIG. 5 also illustrates further color point shifts caused by blue LED wavelengths of 420 nm to 490 nm in 10 nm increments combined with the same amber phosphor as in sub-graph A. Sub-graph C and color point C represent the amber phosphor combined with a 420 nm blue LED. Sub-graph D and color point D are for the amber with a 430 nm blue LED, sub-graph E and color point E are for the amber with a 440 nm blue LED, sub-graph F and color point F are for the amber with a 450 nm blue LED, sub-graph G and color point G are for the amber with a 460 nm blue LED, sub-graph H and color point H are for the amber with a 470 nm blue LED, sub-graph I and color point I are for the amber with a 480 nm blue LED, and sub-graph J and color point J are for the amber with a 490 nm blue LED. By shifting from 410 nm to 420 nm (point B to point C) of same peak intensity, twice the color shift (distance away from the BBL) is achieved. Going from 420 nm to 430 nm (point C to point D) achieves another similarly sized step in color shift. The step size of the shift becomes smaller going to 440 nm (point E), and step size of the shift resulting from 450 nm (point F) is not much different than 440 nm (point E). An interesting phenomenon was observed at 460 nm (point G), where the shift starts to make a U-turn and heads back towards the black body locus. Point H corresponding to 470 nm shifts closer to the BBL than 460 nm (point G). Point I corresponding to 480 nm has less of color shift relative to the BBL than 470 nm (point H), and point J corresponding to 490 nm has a smaller shift relative to the BBL than 480 nm (point I). In fact, 490 nm (point J) and 410 nm (point B) have similar magnitudes of color shifts.

Figure 6A:
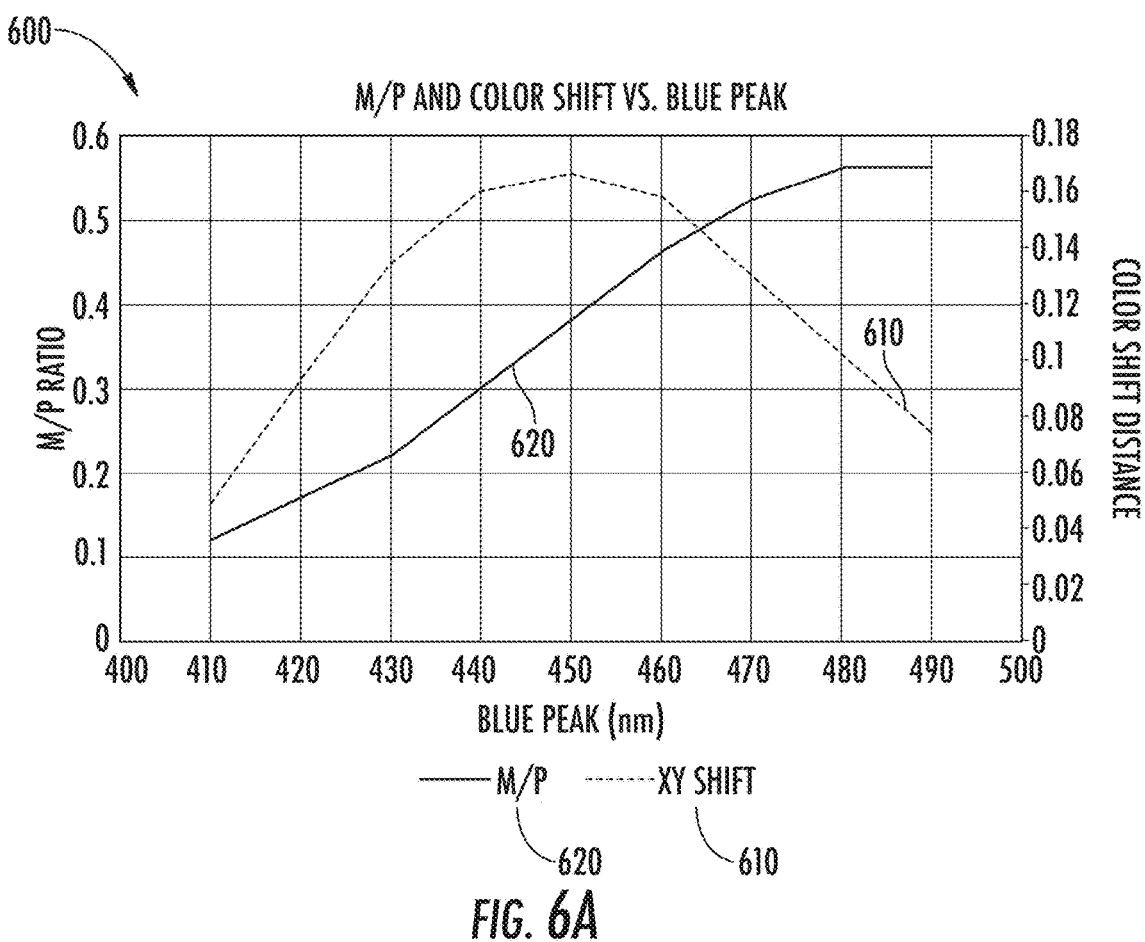
FIGS. 6A-6B are graphs relating color shift and melanopic content as a function of wavelength, in accordance with some embodiments.
Figure 6B:
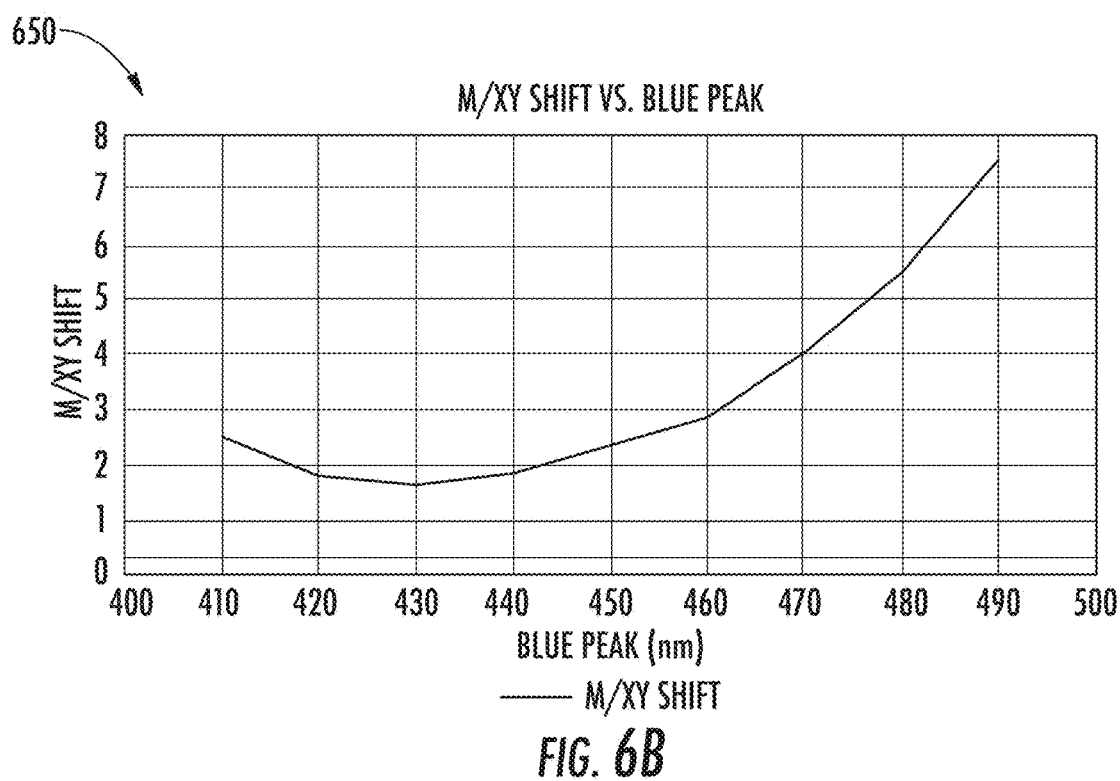

The interaction of this color shift with melanopic content was quantified in terms of color shift and M/P ratio as shown in FIGS. 6A-6B. Graph 600 of FIG. 6A shows the color shift distance 610 and the M/P ratio 620 as a function of blue peak wavelength. Graph 650 of FIG. 6B shows the M/P ratio divided by (x,y) distance from the phosphor point ("M/XY shift"), showing the interaction in terms of melanopic content per color shift. As can be seen in FIG. 6B, a peak emission at 490 nm will achieve the highest amount of melanopic flux per visual color shift. Moreover, from this data, it was deduced that a nighttime-friendly spectrum should contain a blue pump with peak emission from 410 nm to 450 nm, ideally at 430 nm (where the least melanopic content per color shift occurs). However, the most energy efficiency will occur with 450 nm. Consequently, it was determined that for nighttime scenarios, lighting devices of the present disclosure should employ a warm color temperature of CCT from 1800 K to 2500 K (for the integrated spectrum from the entire lighting apparatus) with blue pump peak emission between 430 nm and 450 nm.

Of equal importance to providing the highest amount of stimulation at a given color temperature is the ability to skew that color temperature preference to compensate for colder color temperatures of the biologically stimulating light. Embodiments achieve visually desirable color temperatures using a visual phenomenon known as color constancy, which is known to visual psychophysiologists but has not been used in the lighting industry. Color constancy accounts for the fact that a macular pigment exists in the most central field of view. The believed purpose of the pigment is to protect the fovea from damage from blue light by attenuating these blue wavelengths. Furthermore, the central field of view has a significantly lower amount short wavelength (blue) cones relative to photoreceptors outside this portion of the retina. For these reasons, human color vision is insensitive to blue light in the center field of view. Thus, human color vision uses this color constancy technique to use information from the surrounding environment to determine colors in the central field of view. This is done by taking surrounding color information or information about the light source and subtracting it from a centrally viewed object in order to uncover the true color of said object.

A known example demonstrating color constancy was a photograph of a dress that appeared to be black and blue to some people and white and gold to others. The reason why this dress was perceived differently was based on the observer's assumptions of the light source. Those who assumed the light source to be daylight subtracted that bluish light information and perceived the dress to be yellow and gold. Those who assumed the light source to be warmer incandescent subtracted that yellowish information and perceived the dress to be blue and black. In another example of color constancy, but more relevant to lighting perception, a sun in a blue sky appears yellow, similar to indoor color temperatures preferred by humans, while a moon appears a cooler white in a dark sky. Yet, the solar disk during midday actually has a CCT of 5000 K and the moon in the middle of the sky has a CCT of 4000 K. That is, the sun has a cooler CCT than the moon, yet a human's perception is the opposite.

Another factor that complicates lighting perception is that outdoor lighting is not homogeneous like indoor lighting. Outdoor lighting contains gradients of light that make sunlight feel much warmer by contrast. While daylight is nominally 6500 K, there are few objects in the sky that are actually 6500 K. The combination of sunlight and daylight is comprised of a solar disk of about 5000 K, a colder sky of 8000 K to 20,000 K, and a gradient of light in between, which combine to create an integrated total color of about 6500 K. Embodiments of the present disclosure beneficially utilize this insight by creating a light of otherwise unappealing color temperature (e.g., near 5000 K) in the direction of the intended viewing angle of the end user and contrasting that with much cooler color temperatures, such as 8,000 K to 20,000 K emitted in a direction separated from (e.g., above) the intended viewing angle. This contrast is not a stark difference of two discretely separate colors but rather is designed to create a gradient of colors between white light and much colder bluish colored light. The result is that, unexpectedly, the 5000 K light source appears much more acceptable than data would predict. Furthermore, with a gradient created from the cooler and warmer light sources, an integrated color temperature at the face of an observer of about 5500 K to 8000 K can be achieved.

Thus, by placing two distinct colors of light separate from one another with a gradient in between, colors appear warmer and thus more acceptable for the end user, thereby providing the highest melanopic flux per visual stimulus (melanopic to photopic ratio).

Figure 7B:
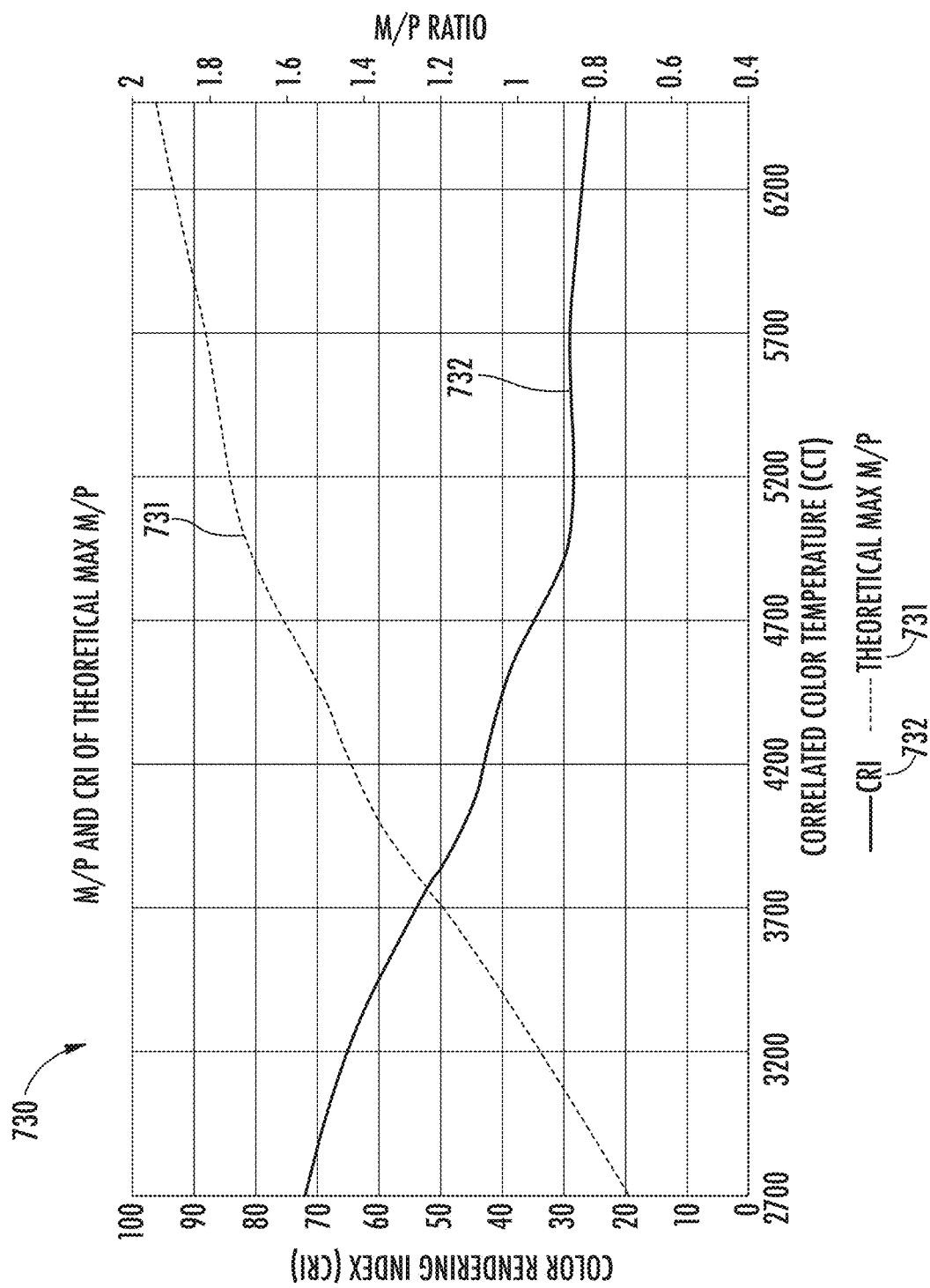
Figure 7C:
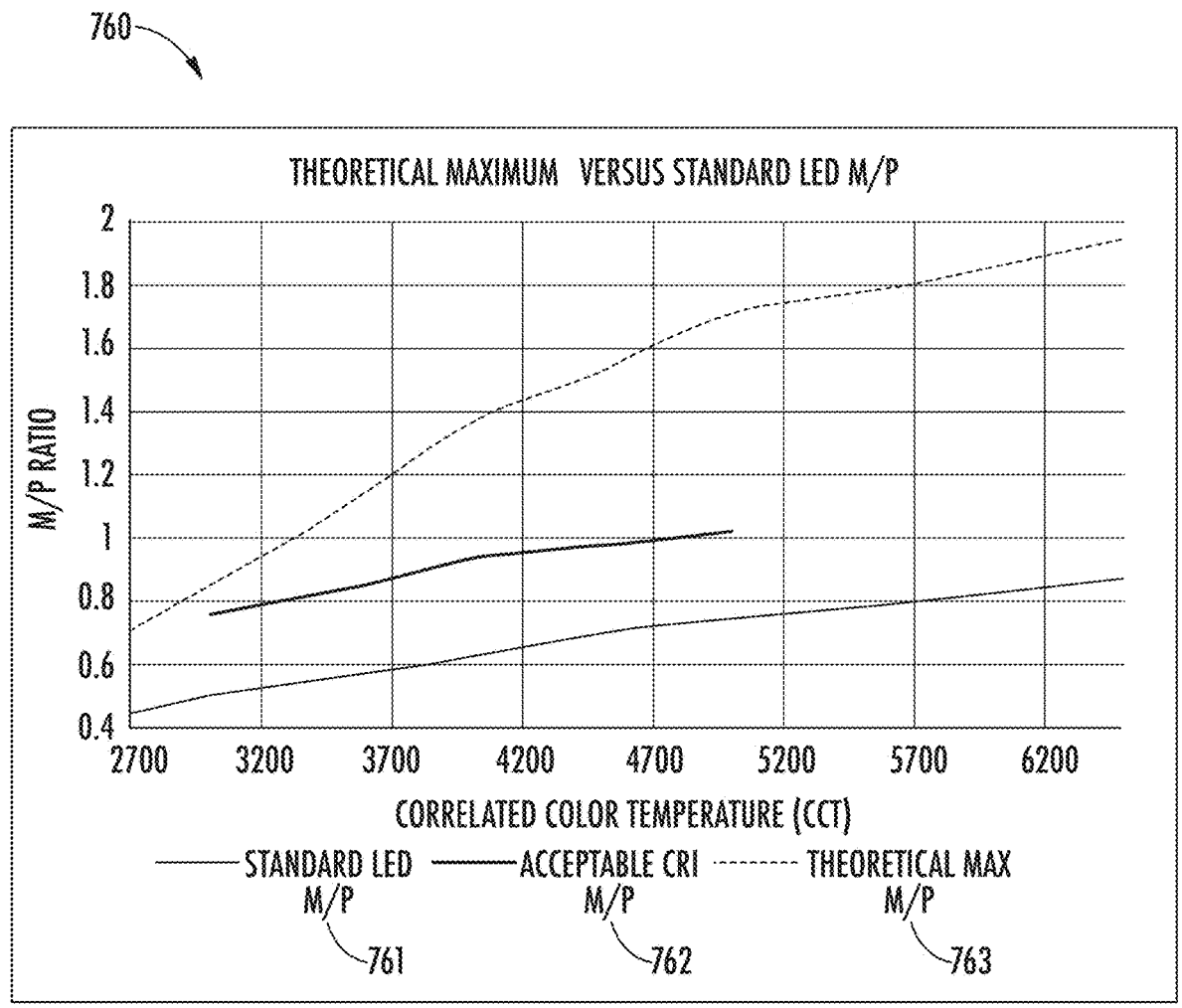

Standard LEDs are unable to deliver light with high M/P ratios while also producing visually acceptable light. FIGS. 7A-7C demonstrate how producing colder color temperatures with high amounts of melanopic light as in the present embodiments is counterintuitive using conventional methods. FIG. 7A is a graph 700 of theoretical maximum M/P spectrums that can be produced for different color temperatures. That is, the spectra are the highest possible M/P ratio that can be produced with the narrow melanopic peak at 490 nm shown in graph 700 for each CCT. Curve 701 is for a CCT of 2700 K, curve 702 is for a CCT of 3000 K, curve 703 is for a CCT of 3500 K, curve 704 is for a CCT of 4000

K, curve 705 is for a CCT of 4500 K, curve 706 is for a CCT of 5000 K, curve 707 is for a CCT of 5700 K, and curve 708 is for a CCT of 6500 K. Each curve has a peak between 480 nm to 490 nm to produce melanopic light. As can be seen from graph 700, the phosphor peak is centered around approximately 600 nm rather than 550 nm (see FIG. 4), and as CCT increases, the intensity of the 480 nm to 490 nm peak relative to the phosphor becomes significantly disproportionate. These types of spectra in FIG. 7A are foreign enough from conventional spectra to skew color rendering to undesirable levels. FIG. 7B is a graph 730 of M/P ratio (curve 731) and color rendering index "CRI" (curve 732) as a function of CCT, where it can be seen that as M/P ratio increases with CCT, the CRI decreases to unacceptable levels (higher CRI is generally desired). FIG. 7C is a graph 760 of theoretical maximum M/P versus standard LED M/P, where curve 761 represents a standard LED M/P ratio, curve 762 represents M/P ratios that have acceptable CRIs (at least 80), and curve 763 represents the theoretical maximum M/P. As can be seen, M/P ratios that can be produced by standard LEDs are <1. Higher M/P ratios, such as greater than 1 in curve 763, result in unacceptable CRIs (being above curve 762). Thus, FIGS. 7A-7C illustrate how conventional LEDs are unable to provide high melanopic ratios with aesthetically pleasing colors.

Spatial Effects

Spatial effects are also carefully considered in the lighting devices of the present disclosure. Historically, horizontal light levels have been the metric by which the lighting industry evaluates electric light and human performance. This horizontal illuminance is illustrated in FIG. 8A, where conventionally the lighting industry has focused on horizontal tasks and light that hits the horizontal work surface. Consequently, light fixtures have been largely designed to be the most effective at delivering horizontal light levels, but not as effective at providing vertical light levels. Typically it is found that general lighting provides 1 vertical lux for every 2 to 3 horizontal lux. Thus it would be a waste of energy to use traditional lighting for physiological effects of light. For example, point A in FIG. 8A indicates a photo sensor that is pointed upward, representing the conventional metric of designing light 810 to provide horizontal illuminance at the desk's surface approximately 2.5 ft above the finished floor. Architectural task lights have also focused on delivering light to the horizontal task plane and minimizing vertical light output for efficiency and visual comfort. In contrast, embodiments of the present disclosure represent a paradigm shift by focusing on vertical illuminance. FIG. 8B illustrates vertical illuminance, which evaluates light emitted on a vertical surface such as a user's face while seated. For example, point B indicates a photo sensor pointed horizontally relative to ground, where the light 820 is designed to provide vertical illuminance at the eye level of a seated person (e.g., approximately 4 ft above the finished floor) with the sensor oriented in the primary "forward" direction that a person would be looking while sitting at their desk. The present embodiments recognize the importance of light that reaches a person's eyes as playing a significant role in healthy circadian rhythms, and uniquely utilizes this understanding in creating a light fixture that focuses on vertical illuminance rather than horizontal illuminance.

Additionally, the present embodiments recognize that spatial distribution of light plays a significant role in the impact of light on the eye's photoreceptors. That is, light coming from above the horizon (and being received in a downward direction by the eye) has a much stronger impact on some melanopsin related photoreceptors than light coming from below the horizon (being received in an upward direction). The lighting devices of the present disclosure target and optimize biological effects via spatial distribution and/or spatial modulation of illumination systems.

These spatial effects are combined with color constancy to produce high melanopic flux in a visually acceptable manner. By either placing two different sources of light separate from one another or by using an object to separate the two light sources, a horizon effect in the mixture (e.g., gradient) region between the two regions of light emitted from the two light sources is created that enhances the perception of light color to the end user. This horizon effect is achieved by an optical diffusing element creating the gradient mixing. The first light spectrum is emitted above the second light spectrum, relative to the ground, in the lighting device's intended installation orientation, with the horizon region between the first and second spectrums.

Figure 9:
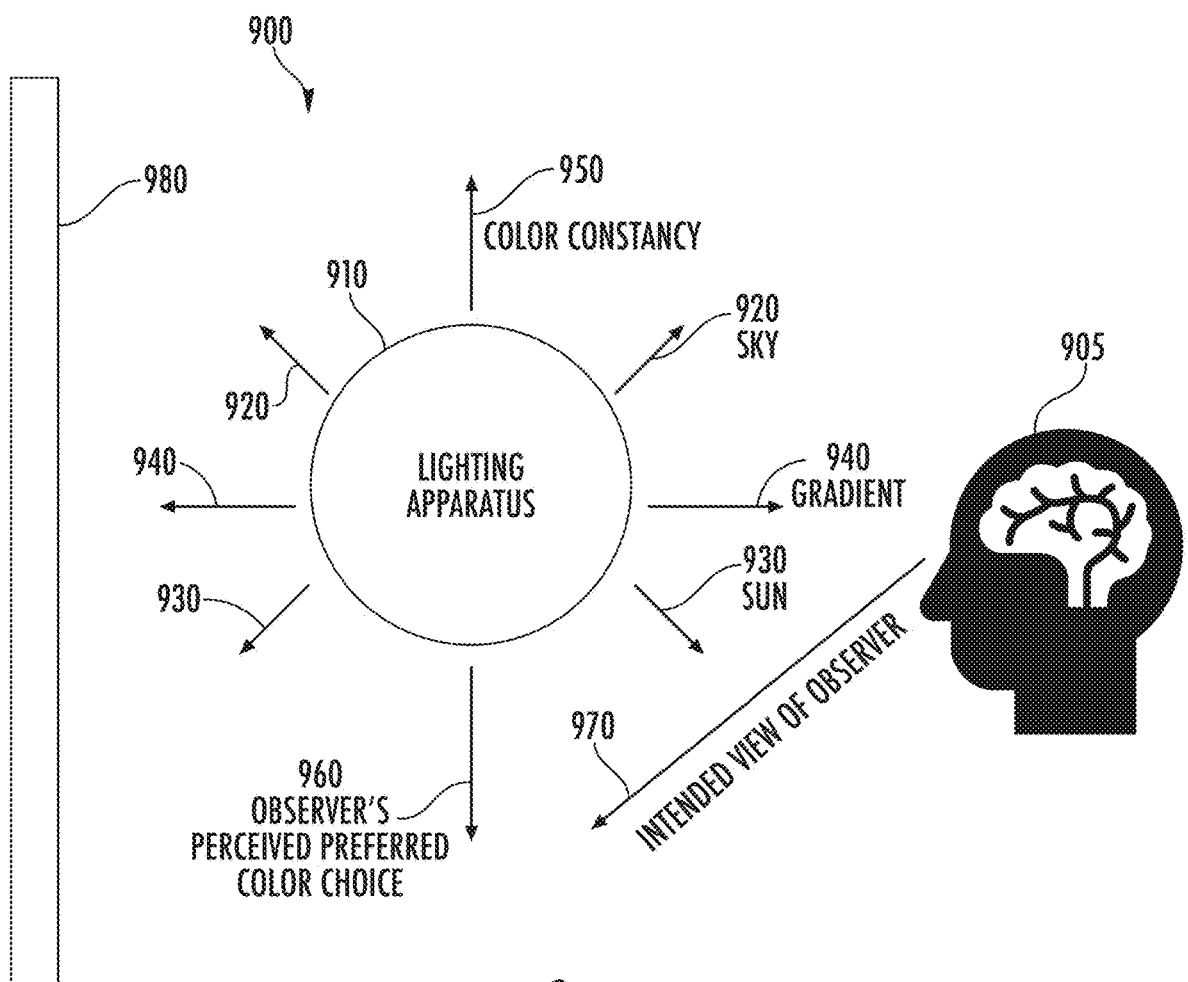
FIG. 9 is a schematic illustrating spatial aspects of color separation, in accordance with some embodiments.

FIG. 9 is a schematic 900 illustrating spatial aspects of the color separation concepts of the present disclosure. Lighting apparatus 910 is shown relative to an observer 905, where the lighting apparatus projects a sky color 920 (bluish color) spatially upward and projects a sun color 930 (warmer color) spatially downward. The two colors are mixed in a gradient region 940 between the upward and downward regions to create direct illumination toward the observer 905. Color constancy 950 drives the deeper blue color in the upward direction, while the integration of the colors drives the observer's perceived preferred color choice 960 in the downward direction. The lighting apparatus is installed relative to the observer 905 such that the primary viewing area (intended view 970 of the observer) is adjacent or below the gradient region 940 of the lighting apparatus 910. In some embodiments, the mixed-light gradient region 940 may be approximately eye level with observer 905. In a non-limiting example, the lighting apparatus 910 may be a task lamp installed (i.e., placed) on the user's desk, where the user's primary viewing area is toward a computer screen adjacent to the lamp. In another example, the lighting apparatus 910 may be a ceiling-mounted pendant fixture where the gradient region is near or above the observer's head (i.e., primary viewing area is adjacent or below the lighting apparatus 910). FIG. 9 also shows the color-separated light 920, 930 and 940 being projected toward a wall 980, where the light can be reflected off the wall 980 and then received by the observer 905. The reflected light results in the same color-separated perception effect as when the light is directly received by the observer.

Glare

Although vertical illuminance is beneficial for a user receiving biological light, vertical illuminance (i.e., delivering light horizontally toward a user's face) is conventionally less desirable because of discomfort due to glare.

Figure 10:
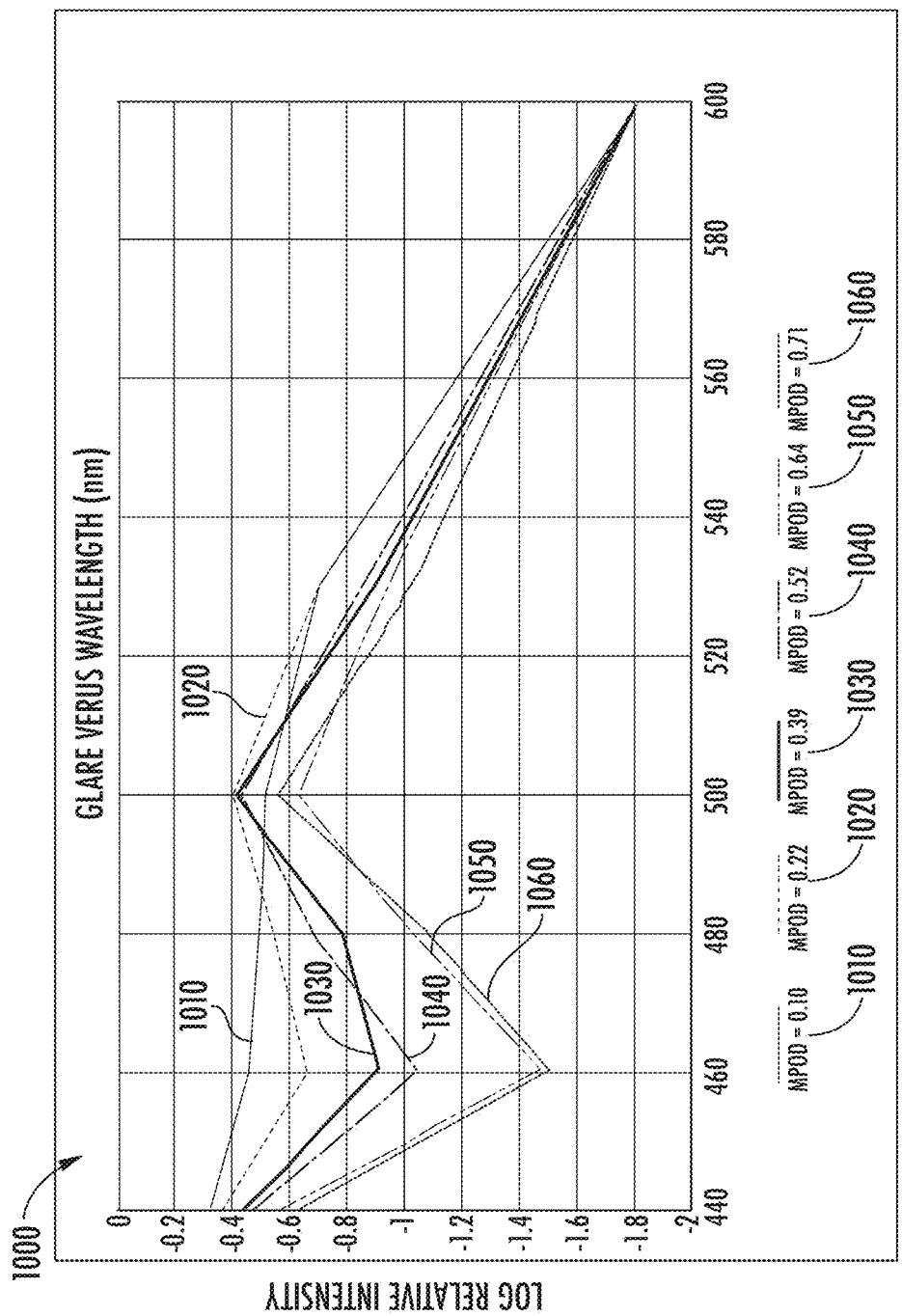
FIG. 10 is a graph of glare response as a function of wavelength, as known in the art.

FIG. 10 is a graph 1000 of glare response versus wavelength, using data recreated from Stringham and Snodderly ("Enhancing Performance While Avoiding Contribution of Macular Pigment," Investigative Ophthalmology & Visual Science, September 2013, Vol. 54, No. 9, p. 6298-6306). The different lines refer to subjects with different macular pigment optical densities (MPOD), where curve 1010 is for MPOD=0.10, curve 1020 is for MPOD=0.22, curve 1030 is for MPOD=0.39, curve 1040 is for MPOD=0.52, curve 1050 is for MPOD=0.64, and curve 1060 is for MPOD=0.71. From the graph 1000, it can be seen that glare sensitivity decreases as wavelength increases. In other words, this known study suggests that cooler white light sources cause more glare than warmer light sources. In one typical example, high-intensity discharge headlamps are very blue in color and very glary. In another common example, cool white streetlights are substantially more glary than warmer ones. Thus, glare response appears to have a spectral component that suggests that the macular pigment protects from glare.

Figure 11:
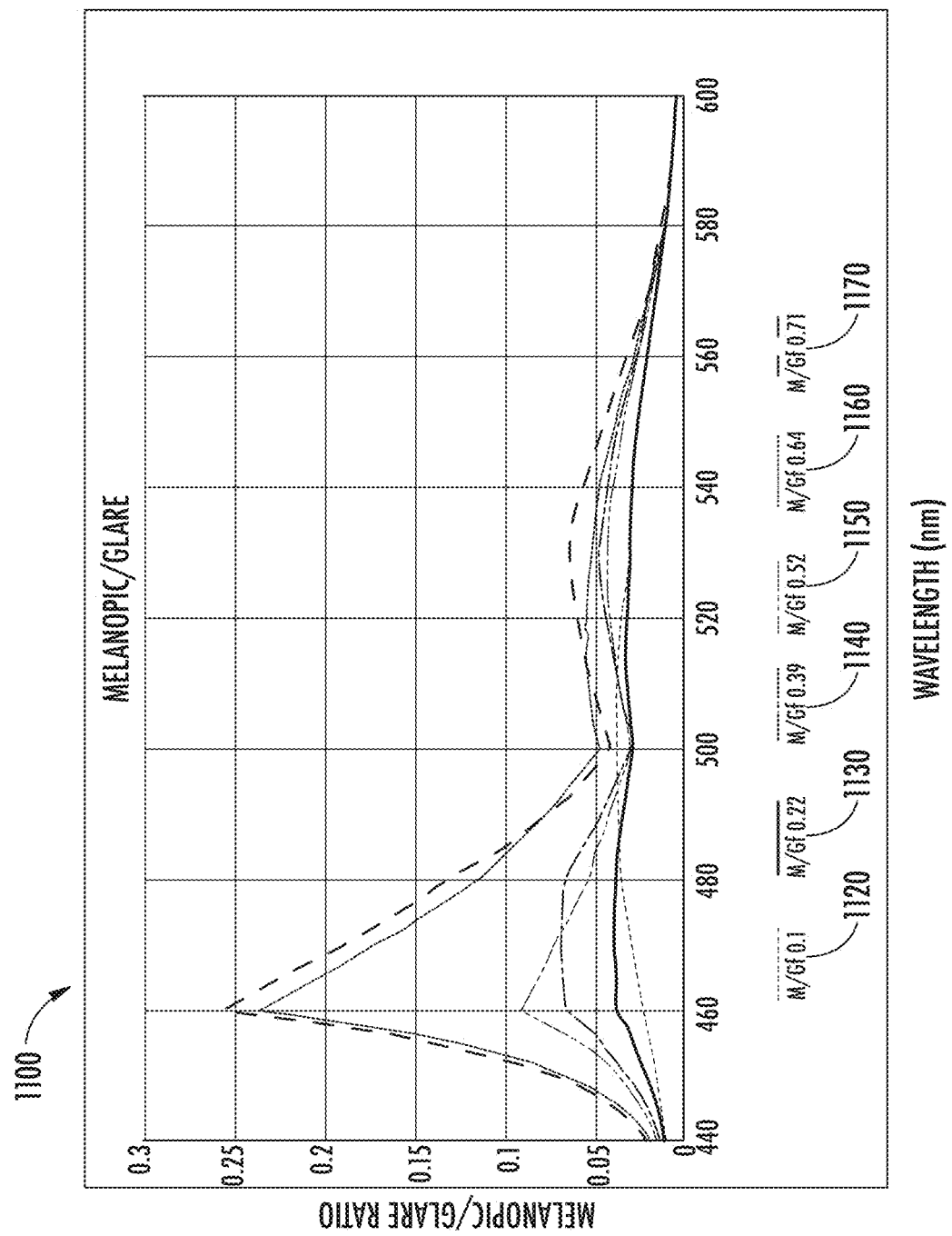
FIG. 11 is a graph describing melanopic light and glare effects as a function of wavelength, in accordance with some embodiments.

FIG. 11 is a graph 1100 of melanopic-to-glare ratio ("M/Gf") versus wavelength, created in relation to this disclosure by dividing the melanopic weighting function by the glare data of FIG. 10. Curve 1120 is calculated from the MPOD=0.10 curve of FIG. 10, curve 1130 is for MPOD=0.22, curve 1140 is for MPOD=0.39, curve 1150 is for MPOD=0.52, curve 1160 is for MPOD=0.64, and curve 1170 is for MPOD=0.71. It can be seen in FIG. 11 that there is a peak at 460 nm with a skew towards 500 nm. This suggests that to achieve the most melanopic content for the glare response, an emitted light spectrum should be designed to have a peak at 460 nm with a skew towards 500 nm.

Figure 12:
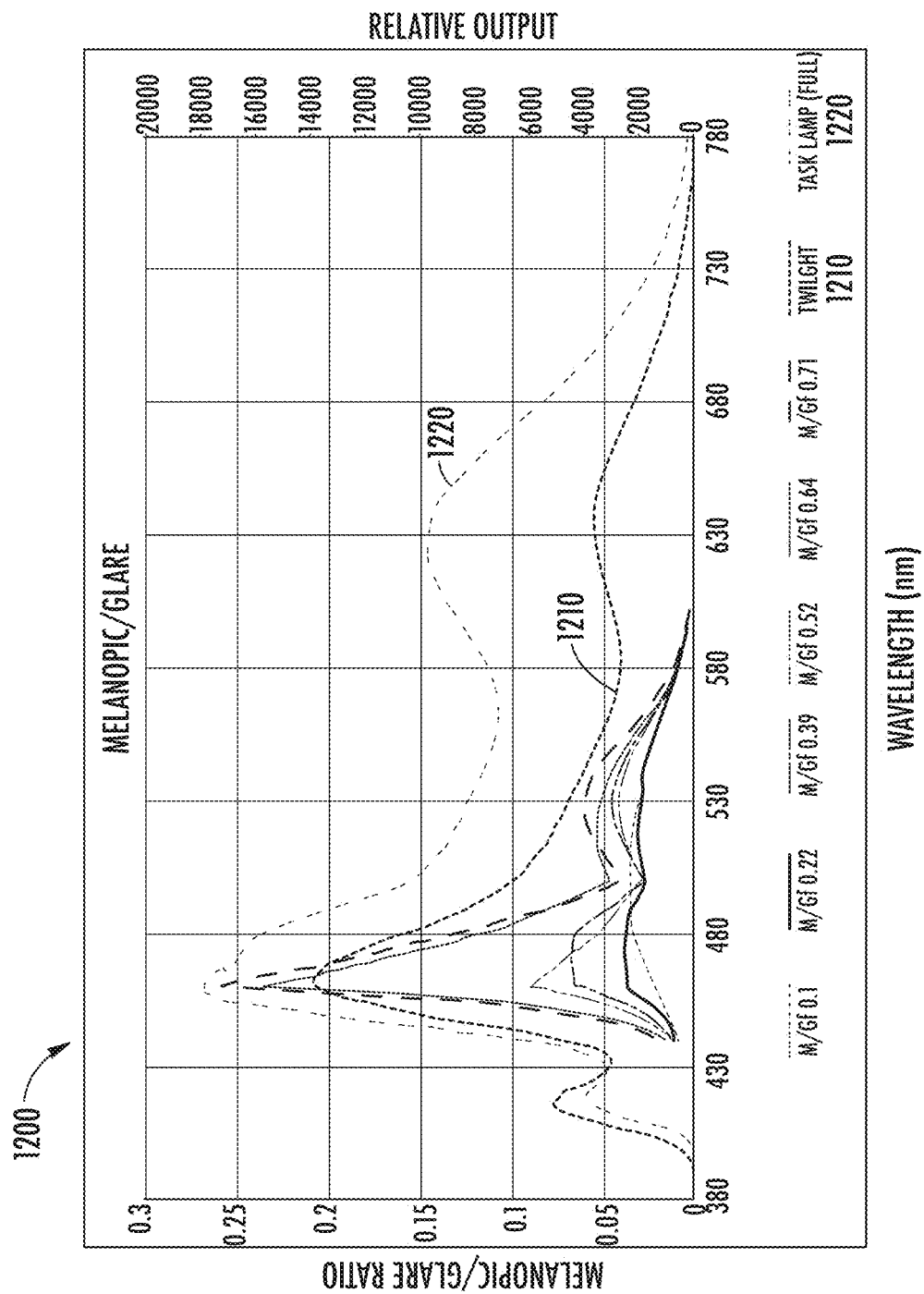
FIG. 12 is an example lighting spectrum overlaid on melanopic-to-glare ratio, in accordance with some embodiments.

FIG. 12 shows an example spectrum 1210 of a lighting apparatus in accordance with some embodiments. The lighting apparatus is a task lamp with an upper region ("twi-light") having a CCT of 17,000 K. The full task lamp has an integrated spectrum 1220 and an average CCT of about 7,000K (i.e., overall spectrum and overall CCT resulting from all the light emitted from the task lamp combined together). These spectra 1210 and 1220 are overlaid on the melanopic-to-glare ratio graph of FIG. 11. The similarity in shapes of the spectra 1210 and 1220 to the Stringham and Snodderly data illustrate that the present embodiments have an optimal melanopic content for the glare response. Thus, the present embodiments achieve very high melanopic ratio while minimizing glare, providing comfortable light to a user despite being directed at their eyes. In other words, the lighting profile (spectrum 1220) of FIG. 12 achieves high melanopic content (480-490 nm) while reducing the amount of glare.

Embodiments of Lighting Devices

Various embodiments shall now be described for lighting apparatuses having color separation to enable efficient delivery of melanopic light to a user. The color temperatures and ranges shall be described primarily in regard to FIG. 13 but shall apply to the other embodiments described throughout this disclosure. The figures illustrate different arrangements of light engines and diffusers that enable various types of lighting apparatuses and various form factors to be implemented.

In this disclosure, an installation orientation of a lighting apparatus refers to the intended orientation and placement of the lighting apparatus relative to a viewer when in in use. For example, the installation orientation of a table lamp or task lamp may be an upright position, with the lighting apparatus near or above a viewer's eye level. The installation orientation of a horizontal ceiling fixture (e.g., a pendant fixture) may be the longitudinal axis of the fixture being approximately parallel to the ground and above the eye level of a viewer.

In the descriptions of the embodiments, "L1" shall refer to the bluish light ("first light spectrum") emitted from the upper region ("first region") of a lighting apparatus; "L2" shall refer to the warm light ("second light spectrum") emitted from the lower region ("second region"), and "L3" shall refer to the mixture of the first light spectrum and second light spectrum that is emitted from a third region in between the first and second regions. To simplify the figures, the label L1 may also be used to indicate the region where light spectrum L1 is emitted, L2 may be used to indicate the region where light spectrum L2 is emitted, and L3 may be used to indicate the region where light spectrum L3 is emitted. Note that in the various embodiments, the light emitted from a light source may be slightly altered as it exits the lighting apparatus but shall be represented with one label for clarity in this disclosure. For example, light spectrum L1 that is emitted outside the diffuser of the lighting apparatus (i.e., fixture) may have a slightly warmer color temperature than the initial light spectrum L1 that is generated inside the fixture, since light spectrum L1 outside the fixture will be combined with reflected L2 light. In another example, light spectrum L2 that is emitted outside the lighting apparatus may be colder than the initial light spectrum L2 produced inside the fixture, since reflected L1 light will contribute to L2 outside the fixture.

Figure 13:
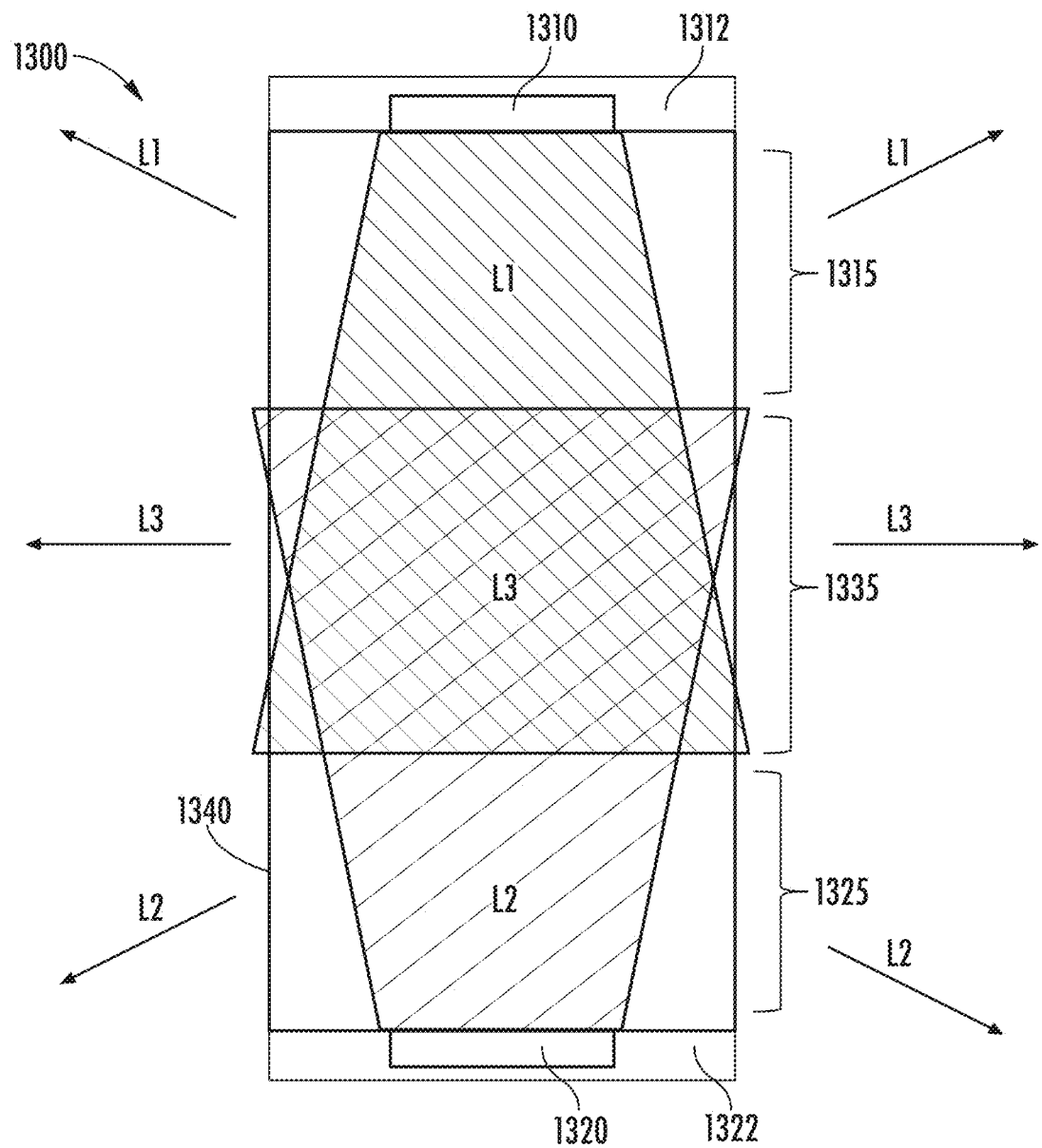
FIG. 13 is a cross-sectional view of a vertical lighting apparatus, in accordance with some embodiments.

FIG. 13 shows a vertical cross-section schematic of a lighting apparatus 1300 configured as a vertical cylindrical lamp (similar to the lamp of FIG. 1) according to some embodiments. The color separation effect is achieved in this embodiment by having two light engines (e.g., LED boards) positioned apart from and facing each other, where a first light engine 1310 produces a first light spectrum L1 in region 1315, and second light engine 1320 emits a first light spectrum L2 in region 1325. Both the first light engine 1310 and the second light engine 1320 are encased by an enclosure, which in this embodiment includes an optical diffuser 1340 and the substrates 1312 and 1322 on which the light engines 1310 and 1320, respectively, are mounted. In other embodiments, the enclosure may consist solely of the optical diffuser or may include other components such as structural framing or additional light-transmitting panels in addition to the optical diffuser. The optical diffuser may also be referred to in this disclosure as an "optical diffusing element" or "diffuser." In an example installed orientation as a task lamp (e.g., sitting on a user's desk or tabletop), the optical diffuser 1340 is approximately parallel to the user's face (i.e., vertical), providing the majority of the light onto the user's face (i.e., providing vertical illuminance).

First light spectrum L1 and second light spectrum L2 are directed toward each other, grazing an inside surface of the diffuser 1340 to form a mixture L3 of the first light spectrum L1 and the second light spectrum L2. That is, the two spectrums of light are placed at a distance from one another, pointing in opposite directions and facing one another allowing a diffuser 1340 to create a gradient mixing. In the first region 1315 of the enclosure, adjacent to first light engine 1310, the first light spectrum L1 is primarily emitted out of diffuser 1340. In the second region 1325 of the enclosure, adjacent to second light engine 1320, the second light spectrum L2 is primarily emitted from diffuser 1340. In other words, light L1 emitted from the upper region 1315 of the lighting apparatus 1300 is primarily from the first light engine 1310, while light L2 emitted from the lower region 1325 of the lighting apparatus 1300 is primarily from the second light engine 1320. In a third region 1335 of the enclosure, between the first region 1315 and the second region 1325, the mixture L3 of L1 and L2 is emitted from diffuser 1340. Thus, first light spectrum L1 is spatially separated from second light spectrum L2, where L3 is a gradient from L1 to L2. The third region L3 creates an effect similar to a horizon line. The optical diffuser 1340 covers the regions 1315, 1325 and 1335.

Each light engine 1310 and 1320 may contain various LEDs to emit a particular light spectrum. In the embodiment of FIG. 13, first light engine 1310 is configured to emit a cool white color, such as a correlated color temperature of >7000 K or >7500 K or >15,000K, while second light engine 1320 is configured to emit a warmer white color, such as a CCT less than (i.e., warmer than) 6500 K or <5000 K, such as approximately 4000 K. In one particular embodiment, the first light spectrum L1 has a CCT of approximately 17,000 K which simulates a natural blue sky, and the second light spectrum L2 has a CCT of approximately 4000 K. Other combinations of colors for light emitted from the upper (cooler color) and lower (warmer color) LED circuits are possible, such as the upper (first) light engine 1310 emitting a purple color (e.g., "twilight") and the bottom (second) light engine 1320 emitting an orange color.

In one embodiment where L1 has a spectrum with a CCT that is approximately 17,000 K and L2 has a spectrum with a CCT that is approximately 4000 K, L3 has a CCT that is a gradient between 4000K and 17,000K, with an average CCT of approximately 7000 K from the combination of L1 and L2. In some embodiments, a difference in CCT of the spectra emitted by L1 and L2 is at least 1000 K, such as greater than 5000 K difference or greater than 10,000 K difference, such as approximately 13,000 K difference (e.g., L1=4000 K, L2=17,000 K) or such as approximately 15,000 K difference (e.g., L1=5000 K, L2=20,000 K). The vertical distance between LED boards (1310 and 1320) can vary, as long as a color separation is created between L1 and L2. The color separation of the present lighting devices allows for biological light to be delivered to a user's eyes in a highly effective manner and with individualized dosing and control for each user, even in an open plan office (i.e., high room cavity ratio) where traditional lighting cannot be nearly as individualized. In one example, the present lighting devices may be used for workers in a night shift (e.g., nurses in a hospital), where melanopic light is provided by a lighting apparatus to the user at their workstation without affecting the overall lighting of the room or facility.

In the embodiment of FIG. 13, the two light engines 1310 and 1320 are positioned opposite each other and facing one another in the lighting apparatus 1300. In such embodiments where the LED boards face each other (i.e., are directed toward each other), the boards may have a minimum distance apart of, for example, at least 6 inches, such as 12 inches or 18 inches. Other configurations of the boards relative to each other are possible, such as the boards being slightly angled instead of directly facing each other or facing outward toward the diffuser surface. In embodiments where L1 and L2 both face outward, the boards may be adjacent to each other or may be separated by a distance between them; additionally, L1 and L2 may be located on the same board with two separate circuits. Also, although the two light engines 1310 and 1320 in FIG. 13 are shown to be at the ends of the lighting apparatus 1300, in other embodiments they may be positioned near the ends or away from the ends while still being separated from each other.

In the embodiment of FIG. 13, the shape of diffuser 1340 is cylindrical, and the LED boards are circular circuit boards to match the ends of the cylinder. However, other shapes for the lamp and components are possible. For example, the lighting apparatus 1300 can be a vertical prism (e.g., triangular, rectangular or hexagonal) with flat surfaces for the diffuser 1340, or a flat panel that is edge-illuminated (i.e., where the LEDs emit light into the edges of the panel and the panel serves as a light guide). In some embodiments, a majority of the diffuser surface may be vertical without needing the entire surface to be vertical. The diffuser 1340 may be made from various translucent materials, such as but not limited to plastics (e.g., polyethylene, polycarbonate, acrylics, polyvinyl chloride), fabrics, papers, and glass (e.g., frosted glass). Plastics include films and stretchable forms such as BARRISOL®. The diffuser 1340 may be smooth or may be textured on the interior and/or exterior surfaces of the lighting apparatus 1300 and may also include coatings.

In some embodiments the diffuser 1340 may be a single, completely continuous piece. In other embodiments, a plurality of diffuser pieces may be joined together to achieve a seemingly continuous diffuser and thus achieve the same visual effect of gradient mixing. Construction of a continuous diffuser could include ornamental or structural pieces intended to support the fixture, or to hide seams, shadowing effects or other optical artifacts, while still appearing continuous to the end user.

In various embodiments, the present lighting devices include a first light engine that produces a first light spectrum having a first correlated color temperature greater than or equal to 7000 K and a second light engine that produces a second light spectrum with a second CCT less than or equal to 6500 K. An enclosure is around the first light engine and the second light engine, the enclosure having an optical diffuser. The optical diffuser is positioned over a first region, a second region and a third region of the enclosure. The first region and the second region are separated by the third region. The first light spectrum is primarily emitted from the first region of the enclosure; the second light spectrum is primarily emitted from the second region of the enclosure; and a mixture of the first light spectrum and the second light spectrum is emitted from the third region of the enclosure.

Figure 14:
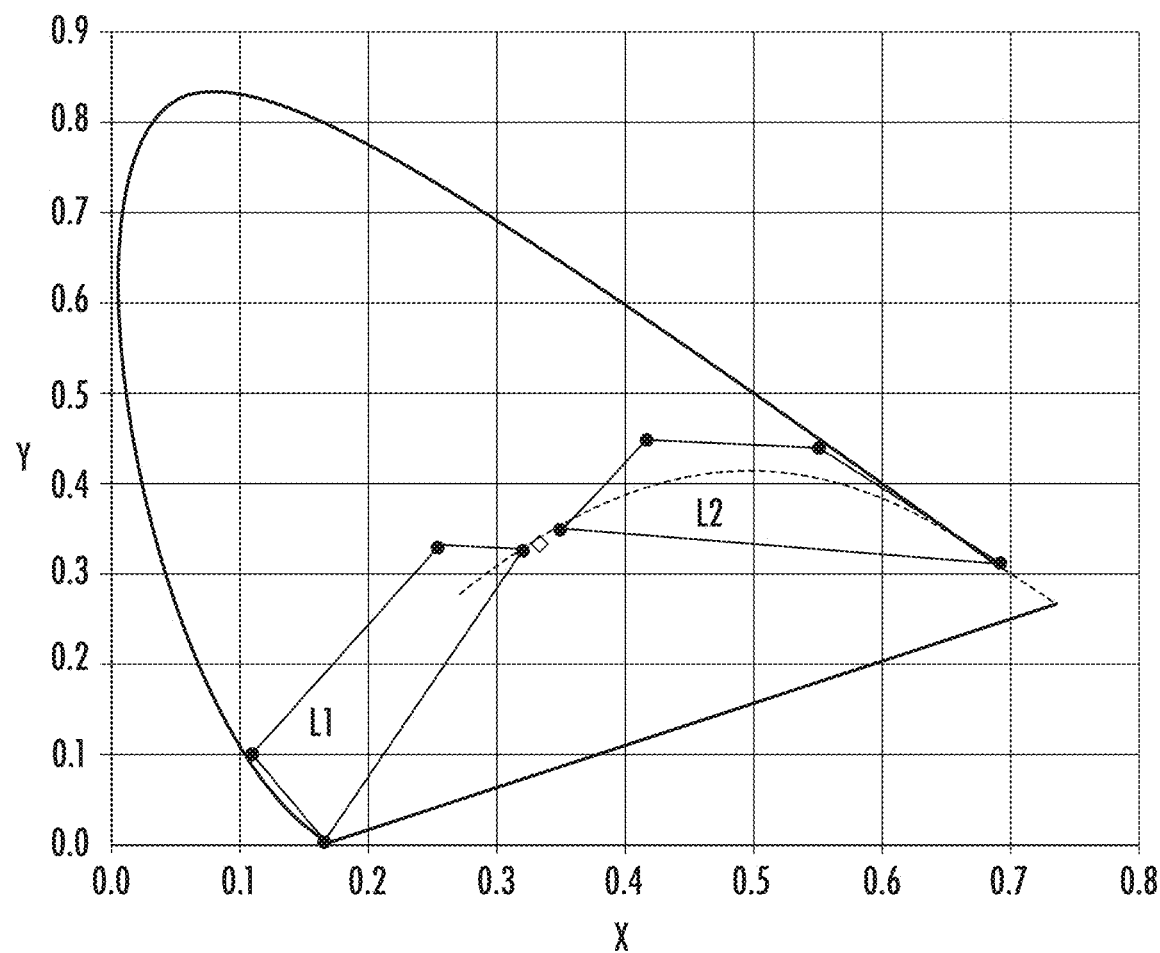
FIG. 14 is a diagram of chromaticity coordinates for lighting spectrums of lighting apparatuses, in accordance with some embodiments.

In some embodiments, a first light engine may produce a first light spectrum having a first CCT greater than or equal to 3500 K. A second light engine produces a second light spectrum having a second CCT less than or equal to 6500 K, where the second CCT is less than the first CCT and the difference between the first CCT and the second CCT is at least 1000 K, such as at least 10,000 K. In some embodiments, as illustrated by FIG. 14, a first light engine may produce a first light spectrum having a first color in a first area bounded by a first set of chromaticity coordinates (x,y) of (0.11, 0.1), (0.16, 0.004), (0.255, 0.33), (0.32, 0.325) in a CIE 1931 color space diagram using 10-degree color matching functions (i.e., the CIE 1964 10-degree Standard Observer, which may also be referred to as the 1964 10° Supplementary Standard Observer or the 10-degree observer), while a second light engine produces a second light spectrum having a second color in a second area bounded by a second set of chromaticity coordinates of (0.55, 0.44), (0.691, 0.311), (0.417, 0.45), (0.35, 0.35) in the CIE 1931 color space diagram using 10-degree color matching functions.

In various embodiments, the present lamps, such as task lamps, include a first light engine (e.g., LED) that emits a first light spectrum with a correlated color temperature greater than 7500 K and a second light engine (e.g., LED) that emits a second light spectrum with a CCT less than 6500 K. A diffuser encases the first light spectrum emitted from the first LED and the second light spectrum emitted from the second LED, where the diffuser is configured to be approximately parallel to a user's face. An upper region of the lamp emits primarily the first light spectrum, the upper region being color separated from a lower region of the lamp that emits primarily the second light spectrum. In various embodiments, task lamps may include a first LED in an upper region of the task lamp, the first LED emitting a first light spectrum with a CCT greater than 7000 K; a second LED in a lower region of the task lamp, the second LED emitting a second light spectrum with a CCT less than 6500 K; and a diffuser. The diffuser encases the first light spectrum emitted from the first LED and the second light spectrum emitted from the second LED, where the diffuser is configured to be approximately parallel to a user's face. The first light spectrum is emitted primarily from the upper region of the task lamp and is color separated from the second light spectrum that is emitted primarily from the lower region of the task lamp.

Figure 15A:
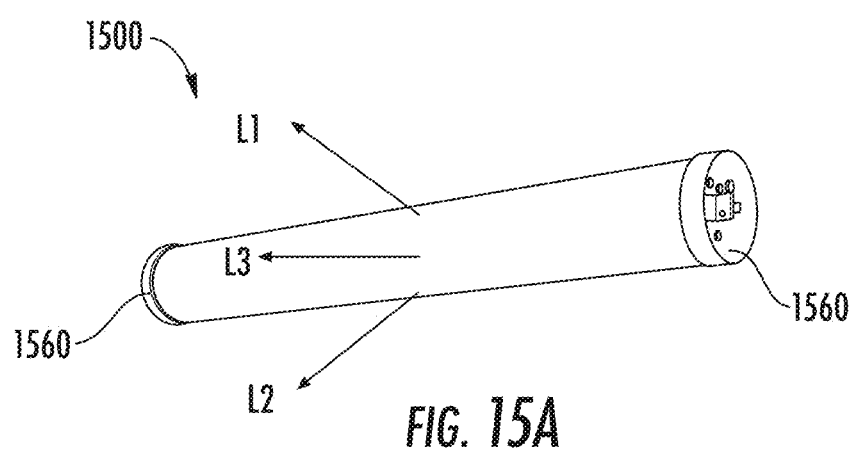
FIGS. 15A-15B are a perspective view and a cross-sectional view, respectively, of a horizontal lighting apparatus, in accordance with some embodiments.
Figure 15B:
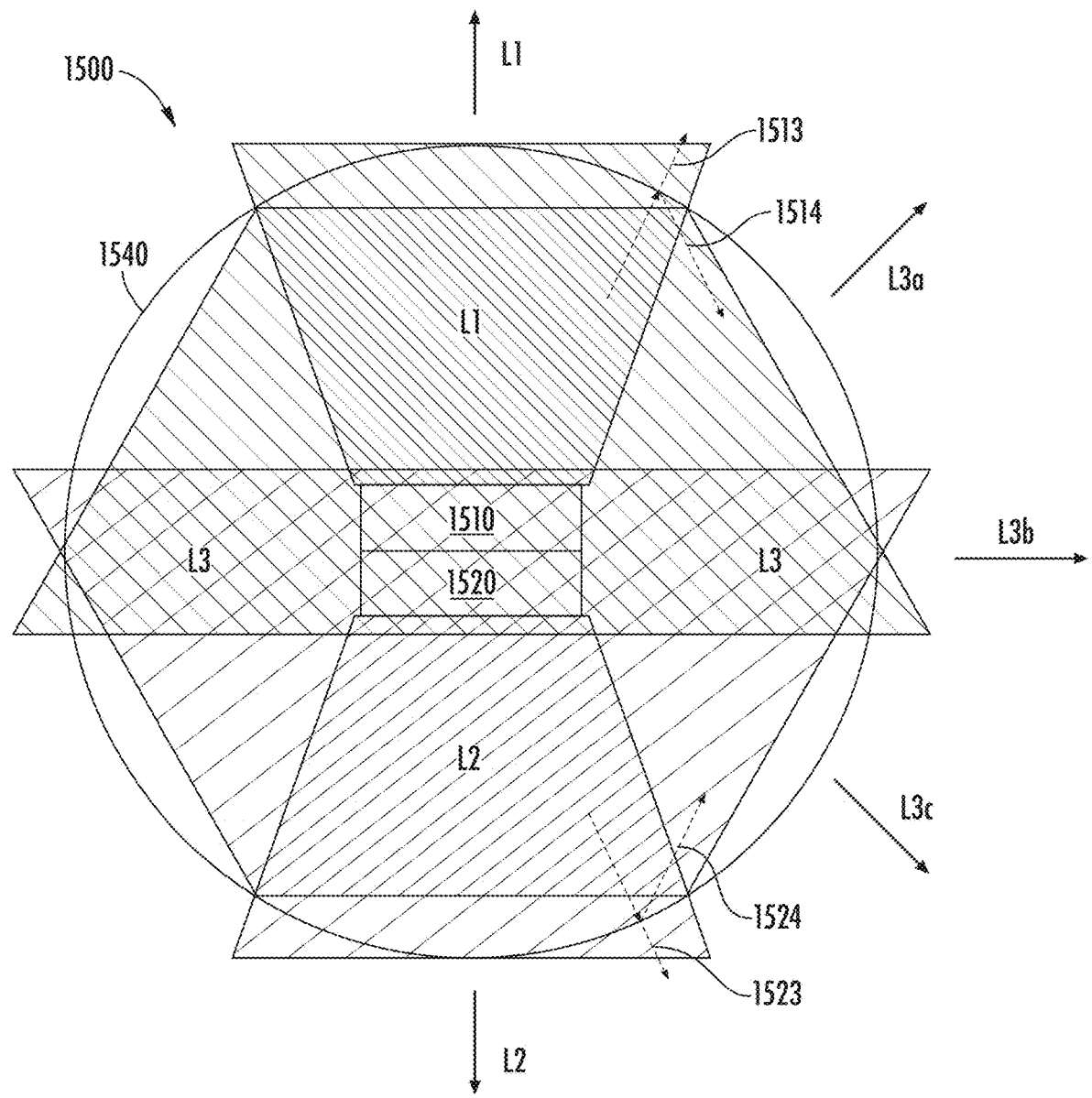

FIG. 15A is a perspective view of a horizontal cylindrical lighting apparatus 1500 used as a ceiling fixture, while FIG. 15B is a cross-sectional view across the diameter of the lighting apparatus. In this embodiment, the effect of creating a horizon is achieved by placing a first light engine 1510 and a second light engine 1520 centrally within the lighting apparatus 1500 and directed away from one another, utilizing a diffuser 1540 to create the gradient mixing. The diffuser 1540 forms the enclosure of the lighting apparatus along with end caps 1560. First light engine 1510 (emitting first light spectrum L1) and second light engine 1520 (emitting second light spectrum L2) may have the CCT or color region ranges as described above in relation to FIG. 13. First light engine 1510 is placed centrally in the lighting fixture 1500 and directed upward, where the translucent diffuser 1540 causes light L1 to be partially transmitted out of (arrow 1513) and partially reflected back into (arrow 1514) the lighting apparatus 1500. Similarly, second light engine 1520 is placed centrally in the lighting fixture and directed downward (e.g., back-to-back with first light engine 1510), where the translucent diffuser 1540 causes the light L2 to be partially transmitted out of (arrow 1523) and partially reflected back into (arrow 1524) the lighting apparatus 1500. The reflection from the diffuser 1540 may be due to the nature of the diffuser material itself (e.g., translucency of material) and/or due to enhancements to promote reflectivity such as a reflective coating or texturing on an interior surface of the optical diffuser.

As a result of this arrangement of L1 and L2 being emitted outward and opposite each other and being partially reflected back within the diffuser, L1, which is emitted from the top of the lighting apparatus, is color-separated from L2 which is emitted from the bottom of the lighting apparatus. L1 and L2 are mixed in the region between, from the light reflected within the diffuser, creating a gradient from the first CCT of the first light engine to the second CCT of the second light engine. In the illustration shown, the gradient progressing from L1 to L2 includes color temperatures L3a, L3b and L3c. In an example embodiment where L1 has a CCT of 14,000 K and L2 has a CCT 4000 K, L3a may be 8000 K, L3b may be 6500 K, and L3c may be 5000 K. Note that the spatial color gradient L3 (i.e., L3a, L3b and L3c) in the emitted light may apply to all embodiments in the present disclosure, even though not illustrated in other figures.

Figure 16:
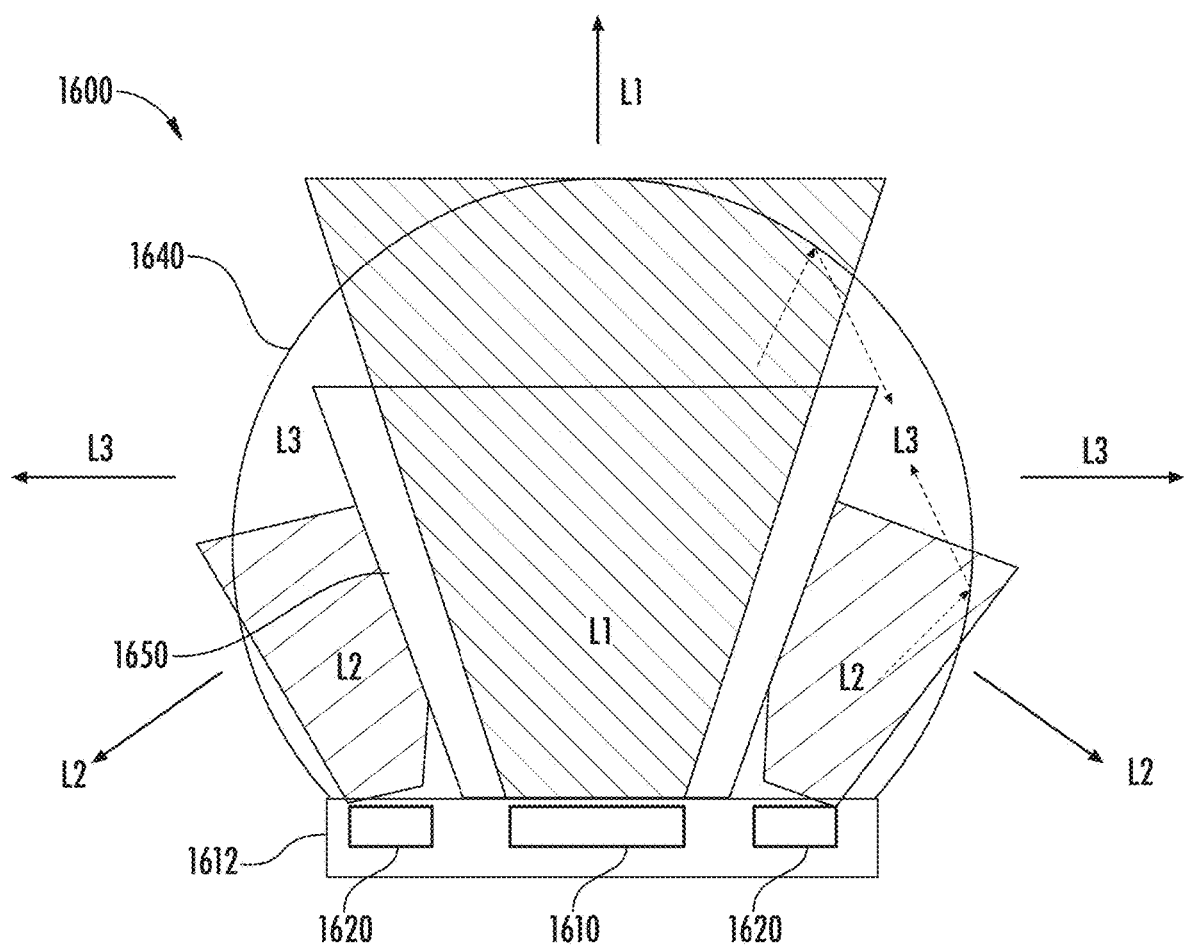
FIG. 16 is a cross-sectional view of another lighting apparatus, in accordance with some embodiments.

FIG. 16 is a cross-sectional view of an embodiment of a lighting apparatus 1600 in which two light sources—first light engine 1610 and second light engine 1620—are coplanar on a substrate 1612. A reflective element 1650 is utilized to separate the first light spectrum L1 (produced by first light engine 1610) and second light spectrum L2 (produced by second light engine 1620) from one another. Substrate 1612 is located on the bottom of the lighting apparatus 1600 and forms, along with diffuser 1640, an enclosure around the first light engine 1610 and the second light engine 1620. Diffuser 1640 is over the regions L1, L2 and L3 where light is emitted from the lighting apparatus. Both L1 and L2 are directed upward in the installation orientation of the lighting apparatus. In one embodiment, the lighting apparatus 1600 may be a spherical fixture with first light engine 1610 in the center of substrate 1612 and second light engine 1620 being a ring of LEDs surrounding the first LED board 1610. In another embodiment, the lighting apparatus 1600 may be a longitudinal lighting fixture with first light engine 1610 being a row of LEDs along a central axis of the substrate 1612, and second light engine 1620 being additional LEDs on either side of the central row (first light engine 1610). Reflector 1650 may be, for example, a cone-shaped or trough-shaped reflective material such as a metal or a plastic coated with reflective material. The reflector 1650 maintains color separation between L1 and L2, while the diffuser 1640 causes gradient mixing of L1 and L2 due to reflection from the inside surface of the diffuser (dashed arrows). The color temperatures and wavelength ranges for L1 and L2 may be the same as described in the previous embodiments. In one embodiment, the lighting apparatus 1600 may be the light emitting portion of an Edison style A-lamp.

Figure 17:
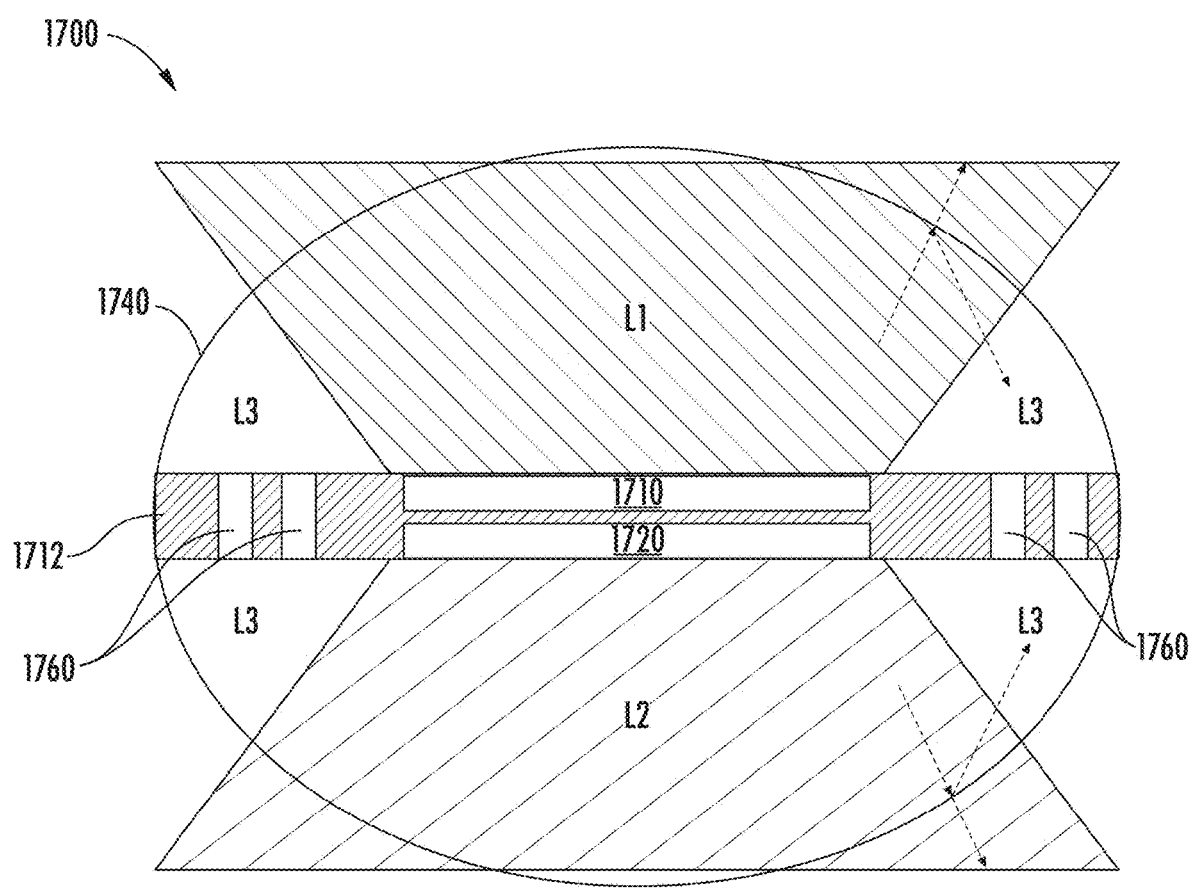
FIG. 17 is a cross-sectional view of yet another lighting apparatus, in accordance with some embodiments.

FIG. 17 is a cross-sectional view of another embodiment of a lighting apparatus 1700 in which light output from first light engine 1710 and second light engine 1720 are separated by a physical barrier. The lighting apparatus 1700 may be, for example, a horizontal cylinder similar to FIG. 15A when the lighting apparatus 1700 is in its intended installed orientation. In this embodiment, first light engine 1710 is mounted on one side of substrate 1712, and second light engine 1720 is mounted on the opposite surface of substrate 1712. Substrate 1712 is mounted in the interior (e.g., the center) of the lighting apparatus, with its edges extending to the diffuser 1740 to form a physical barrier between L1 and L2. Similar to FIG. 15B, some of the light from L1 and L2 bounces off the interior of the diffuser 1740, as indicated by the dashed arrows. Through-holes 1760 near the edges of the substrate 1712 enable the reflected light L1 and L2 to blend together, creating a mixed light L3 from L1 and L2.

Figure 18A:
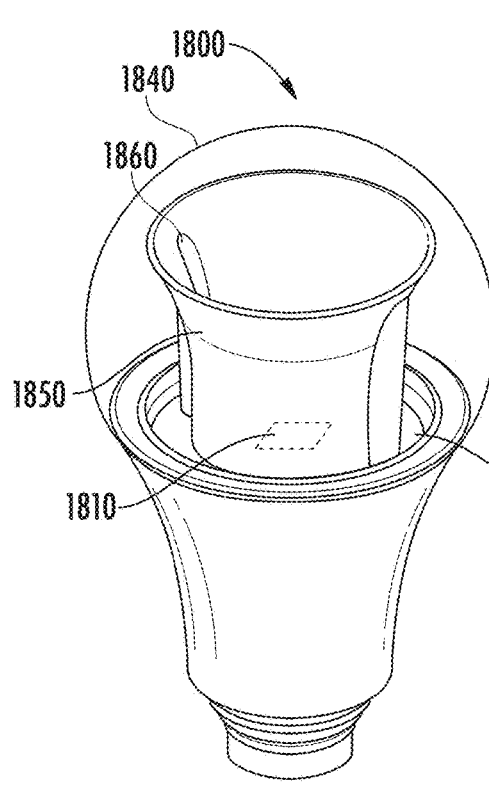
FIGS. 18A-18C provide a perspective view and cross-sectional views of a lighting apparatus configured as a light bulb, in accordance with some embodiments.
Figure 18B:
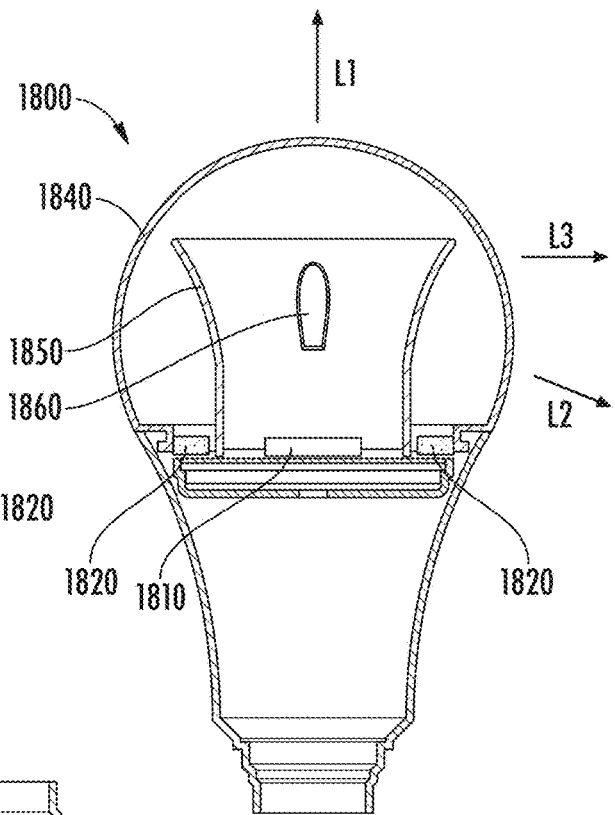
Figure 18C:
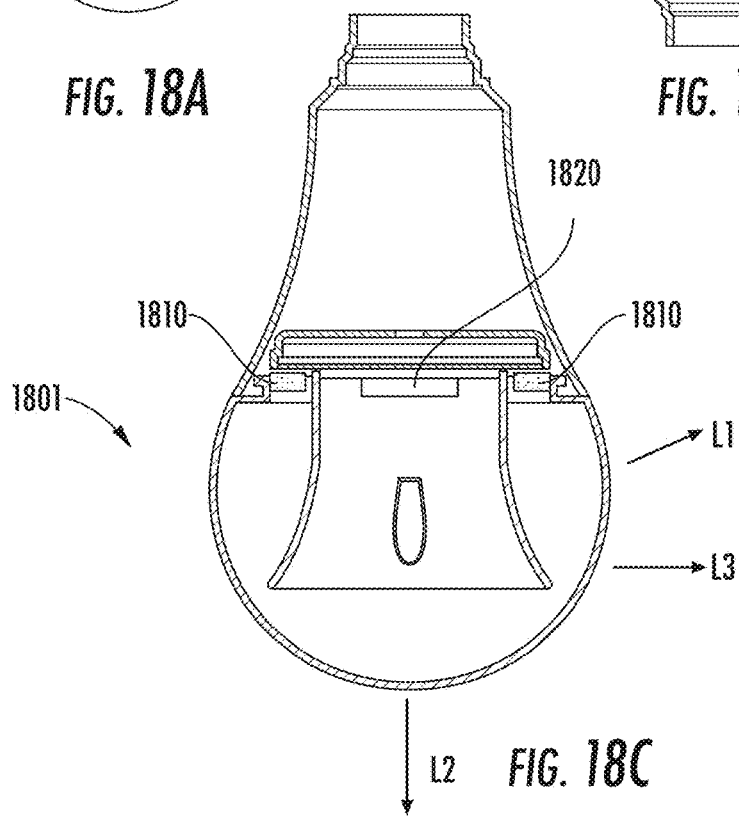

FIGS. 18A-18C show an embodiment of lighting apparatuses 1800 and 1801 in the form of a light bulb, which enable standard lighting fixtures to be converted to emit color-separated melanopic light. FIG. 18A is a perspective view; FIG. 18B is a cross-sectional view of the light bulb of FIG. 18A in an upward installation orientation, such as in a table lamp; and FIG. 18C is a cross-sectional view of a light bulb 1801 in a downward installation orientation, such as in a ceiling fixture. Similar to the previous embodiments, the light bulbs of FIGS. 18A-18C have a first light engine 1810, a second light engine 1820 and an optical diffuser 1840. In FIGS. 18A-18B, first light engine 1810 is in the center of the base of the bulb 1800, and second light engine 1820 surrounds first light engine 1810. A reflective element 1850 in the shape of a flared cylinder separates the light output L1 (from first light engine 1810) and L2 (from second light engine 1820). The reflective element 1850 has a hole 1860 that allows the light L1 and L2 to mix, forming mixed light profile L3. In the upward orientation of FIG. 18B, L1 is emitted upwards relative to the ground, with L2 below L1, and L3 in between L1 and L2. In the downward orientation of FIG. 18C, the first light engine 1810 is in the periphery of the bulb's base, with second light engine 1820 in the center of the base so that L1 is still emitted upward relative to the ground and L2 is emitted downward.

Figure 19:
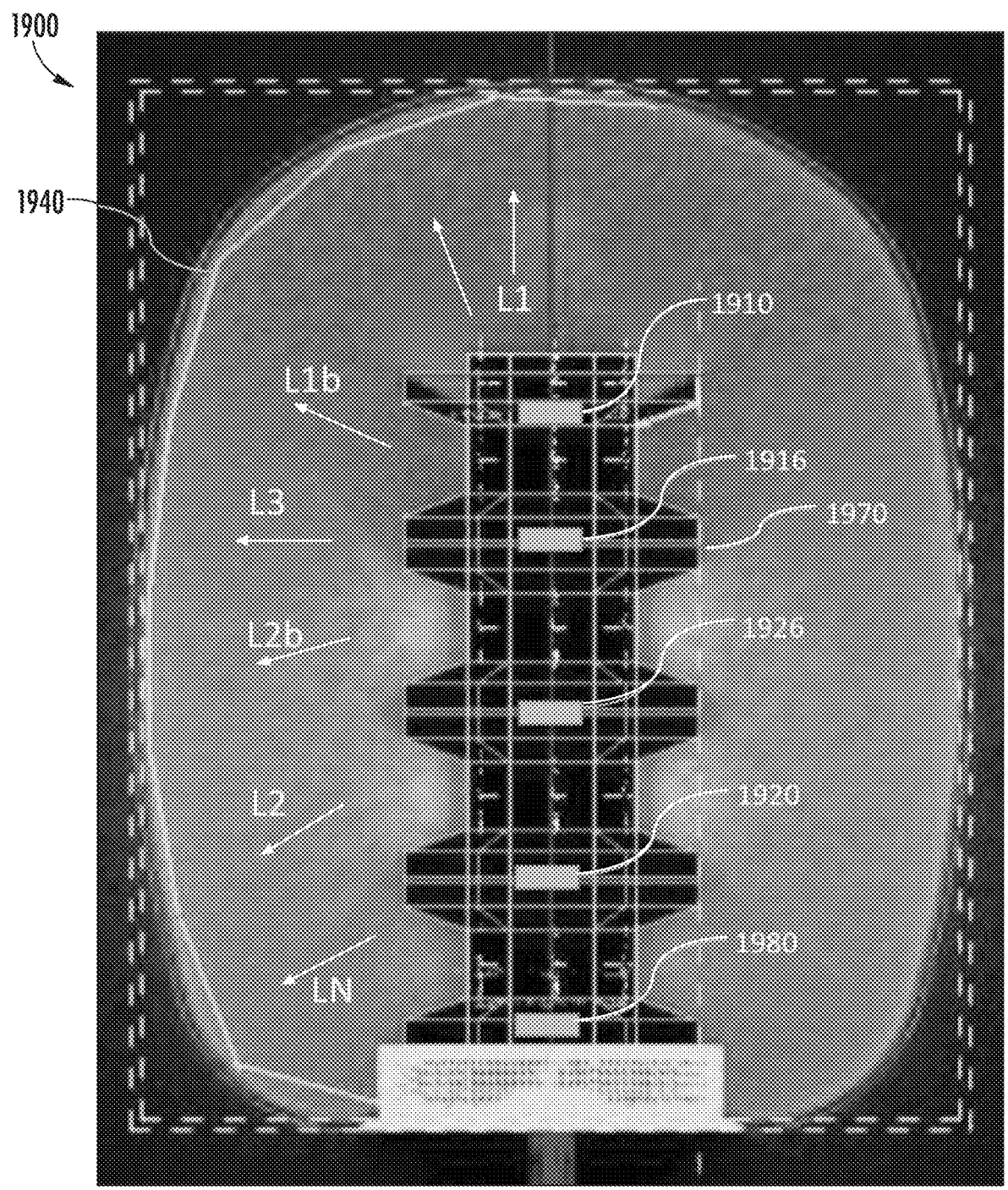
FIG. 19 is a cross-sectional view of a lighting apparatus with multiple light engines, in accordance with some embodiments.

FIG. 19 shows yet another embodiment of a lighting apparatus 1900 configured as a task lamp with more than two light engines to enable various light spectrums to be emitted. In this embodiment, there are five light sources arranged along a vertical tower 1970, with optical diffuser 1940 surrounding the tower. A first light engine 1910 may be, for example, an 8000 K to 20,000K uplight (i.e., upward-directed light) that emits a first light spectrum L1. An auxiliary first light engine 1916 below first light engine 1910 may also be an 8000 K to 20,000 K uplight, emitting light L1b that is similar or slightly warmer than L1. A second light engine 1920 in a lower portion of tower 1970, and an auxiliary second light engine 1926 above second light engine 1920, may both be 3500 K to 5000 K downlights (i.e., downward-directed lights), where second light engine 1920 emits light L2 that may be the same as or slightly warmer than light L2b from auxiliary second light engine 1926. The bottom light engine 1980 may be, for example, a dedicated downlight emitting a nighttime-focused light spectrum LN that has a CCT of approximately 2200 K with red added (e.g., greater than approximately 700 nm). Diffuser 1940 causes gradient mixing between successive light outputs, such as L3 being a mixture of L1b and L2b.

The addition of auxiliary first light engine 1916, auxiliary second light engine 1926 and bottom light engine 1980 to first light engine 1910 and second light engine 1920 can enable light profiles to be customized even further, such as for producing scenes simulating natural lighting over the course of a day. In some embodiments, a controller may be connected to the lighting apparatus 1900 (or any of the lighting apparatuses in this disclosure) to implement dimming profiles according to a time of day, where the dimming profiles (which shall be described in more detail later) may include a sunrise scene, a daytime scene, daytime cloudy scene, a sunset scene, and a nighttime scene.

Figure 20:
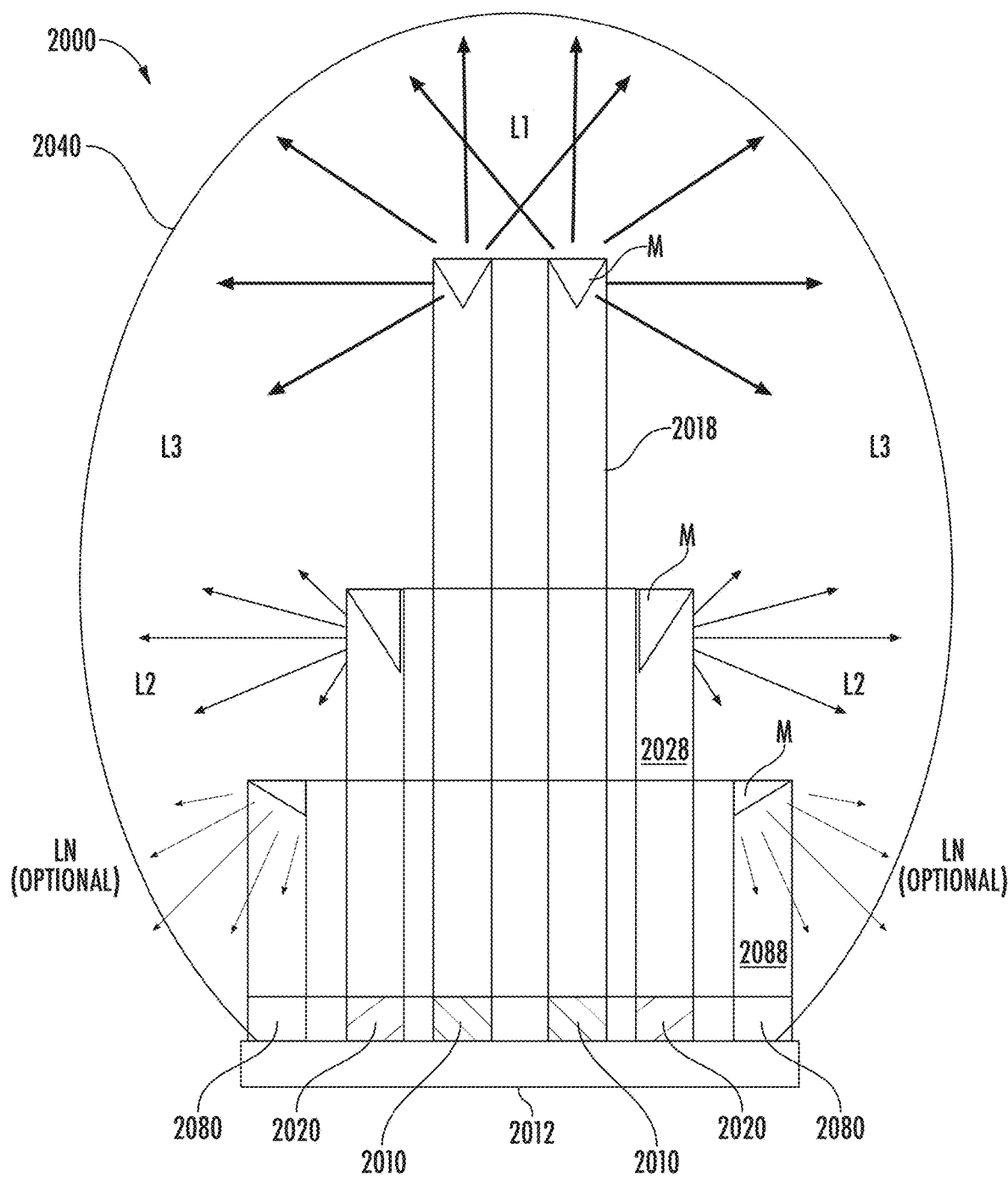
FIG. 20 is a cross-sectional view of a lighting apparatus having light guides, in accordance with some embodiments.

FIG. 20 shows a further embodiment of a lighting apparatus 2000 that uses light guides to create the color separation effect. Lighting apparatus 2000 includes first light engines 2010 and second light engines 2020 mounted on and facing upward from substrate 2012. Optical diffuser 2040 surrounds the regions in which light is emitted from the light engines and forms an enclosure along with substrate 2012 for the lighting apparatus 2000. A light guide is vertically oriented on top of each light engine, with each light guide having a reflector or mirror "M" at its tip to direct the light produced from each of the light engines. In some embodiments, the reflector M may be an element other than a mirror, such as semi-reflective material or textured material that scatters or redirects light. The light guides having different heights to direct light output to different regions of the lighting apparatus. Light guide 2018 for first light engines 2010 have the longest length, such that light L1 is produced from an upper, first region of the lighting apparatus 2000. Light guides 2028 for second light engines 2020 have a shorter length than light guides 2018, such that light L2 is produced in a second region below the first region L1. As light L1 and L2 bounce of the interior of the optical diffuser 2040, mixed light profile L3 is created in a third region between the first region L1 and second region L2. Lighting apparatus 2000 may optionally include a third light engine 2080 which may be used to create additional lighting profiles, such as for dimming profiles over the course of a day. Third light engine 2080 may be, for example, a nighttime-focused light spectrum LN having a CCT of approximately 2200 K with red added (e.g., visible red, such as 620 nm to 630 nm, or such as approximately 625 nm), where LN is emitted in a downward direction via light guide 2088.

Figure 21:
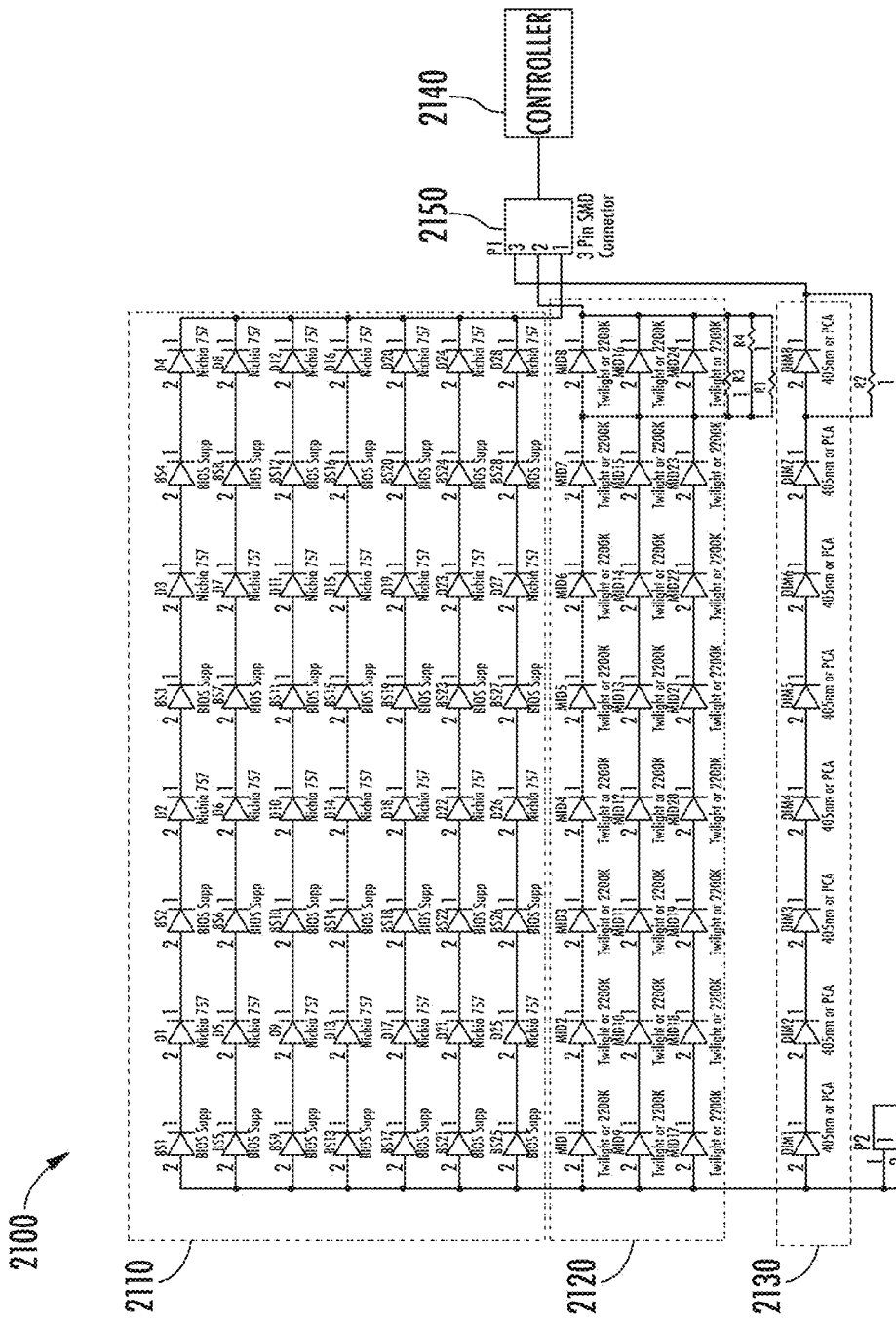
FIG. 21 is a schematic of an LED board, in accordance with some embodiments.

FIG. 21 shows an example schematic of a printed circuit LED board 2100 for lighting apparatuses of the present disclosure. The LED board 2100 can be used as a light engine for producing either the upper light spectrum (L1) or lower light spectrum (L2), with certain LEDs on the board being utilized depending on which position it is mounted into within the lighting device. The embodiment FIG. 21 contains arrays of three independently controllable LED circuits. A first circuit 2110 contains melanopic LEDs ("BIOS Supp") and 3500 K white LEDs (e.g., Nichia 757) used for either an L1 or L2 light spectrum. A second circuit 2120 contains either 2200 K LEDs if it is used on an L2 LED board or a 17,000K "Twilight" LED if it is used on an L1 LED board. A third circuit 2130 contains either a Phosphor Converted Amber ("PCA") LED if it is used on an L2 LED board or a 405 nm LED if it is used on an L1 LED board. A controller 2140 may be in communication with the circuits 2110, 2120 and 2130, such as through connector 2150, to control the lighting output from the LEDs and to implement various dimming profiles. In further embodiments, additional LED populations may included, such as an LED with a CCT higher than 20,000K, for the upward portion of the multi-zone lamp of FIG. 19.

Each of these circuits 2110, 2120 and 2130 can be combined in various proportions to produce a desired color temperature for the light emitted from the board 2100. For example, combinations of the LEDs can be activated to produce CCTs of less than 6500 K or less than 5000 K, such as 4000 K or 3500 K for the lower region (L2) of a lighting apparatus. For the upper region of the lighting apparatus, combinations of the LEDs can be activated to produce CCTs of greater than 7000 K, for example greater than 10,000 K, such as 17,000 K. The various types of LEDs may be arranged on the board to produce a uniform light distribution. For example, in a cylindrical lighting apparatus the different types of LEDs may be arranged in concentric rings, with one color of LED in an outer ring, a second color in a central ring, and another color in the center. For a lighting apparatus having flat surfaces (e.g. a rectangular prism), different color LEDs may be arranged in linear arrays or may be interspersed with each other such as in an alternating manner.

In various embodiments of the lighting apparatuses disclosed herein, the first region is vertically above the second region, relative to the ground, in an installation orientation of the lighting apparatus. In some embodiments, a primary viewing area of a viewer is adjacent or below the third region in an installation orientation of the lighting apparatus. In some embodiments, in an installation orientation of the lighting apparatus, the first light spectrum is emitted upward relative to the ground, the mixture is emitted in a horizontal direction, and the second light spectrum is emitted downward relative to the ground.

In various embodiments of the lighting apparatuses disclosed herein, the first light engine emits a first blue emission peak in a first wavelength range of 450 nm to 480 nm, and the second light engine emits a second blue emission peak in a second wavelength range of 480 nm to 500 nm. In some embodiments, a total melanopic to photopic ratio (M/P ratio) emitted by the lighting apparatus is greater than 1.0 or more, such as greater than 1.3, as received by a user at the user's location. In some embodiments, the first CCT is at least 17,000 K and the second CCT is 4000 K to 5000 K. In some embodiments, the first CCT is at least 17,000 K and the first light spectrum has a melanopic to photopic ratio (M/P ratio) greater than or equal to 1.7. In some embodiments, the mixture emitted from the third region has a third CCT profile comprising a gradient from the first CCT to the second CCT.

In some embodiments, a first light emitting diode (LED) of the first light engine and a second LED of the second light engine face each other and are near opposite ends of the lighting apparatus. In some embodiments, the optical diffuser is a continuous piece covering the first region, the second region and the third region. In some embodiments, the optical diffuser comprises a translucent material, and at least one of the first light spectrum and the second light spectrum partially reflects off an interior surface of the optical diffuser.

Spectral Profiles and Dimming Profiles

Figure 22:
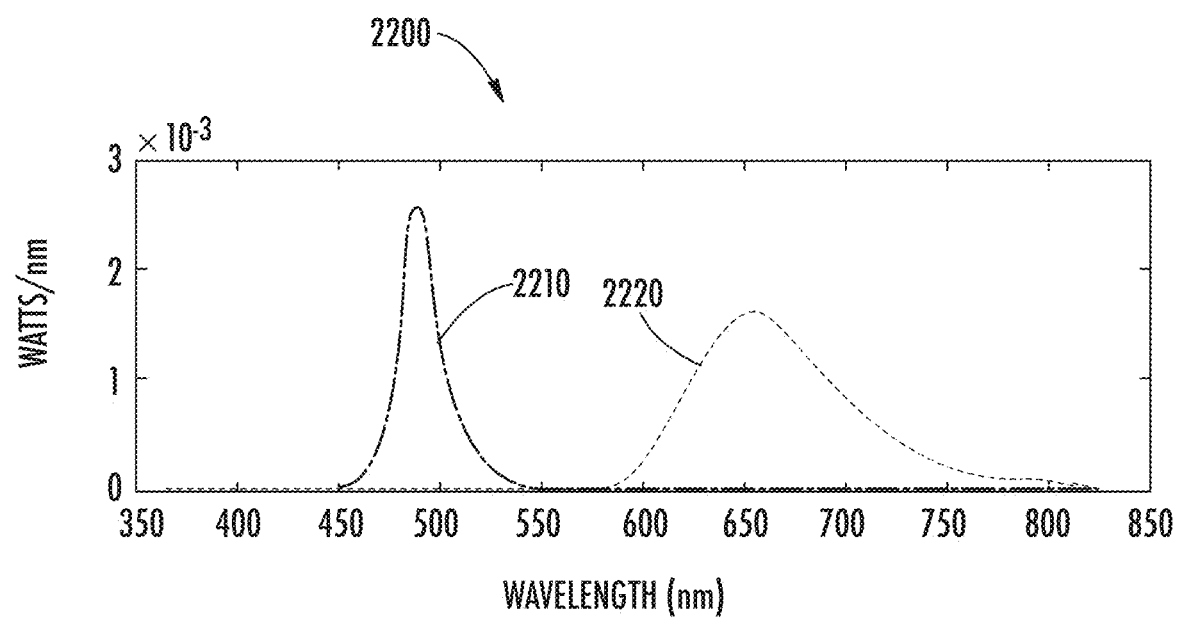
FIG. 22 is an example spectrum of an LED used in lighting apparatuses, in accordance with some embodiments.
Figure 23A:
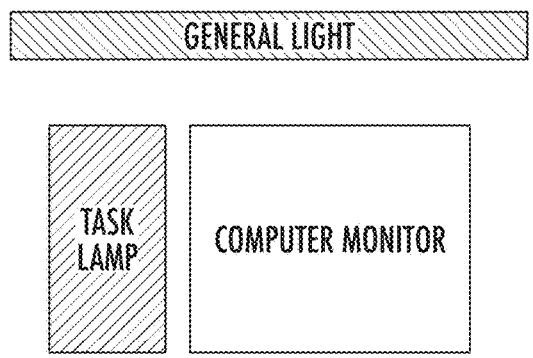
FIGS. 23A-23D are diagrams of lighting scenarios used in pupillometry testing, in accordance with some embodiments.
Figure 23B:
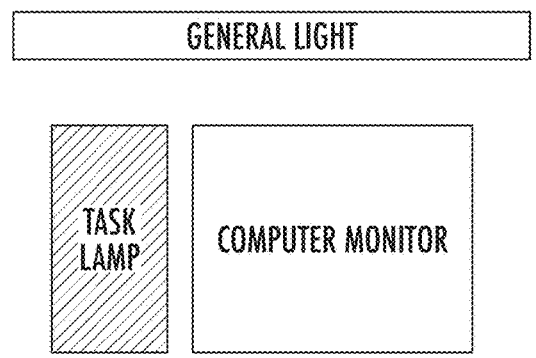
Figure 23C:
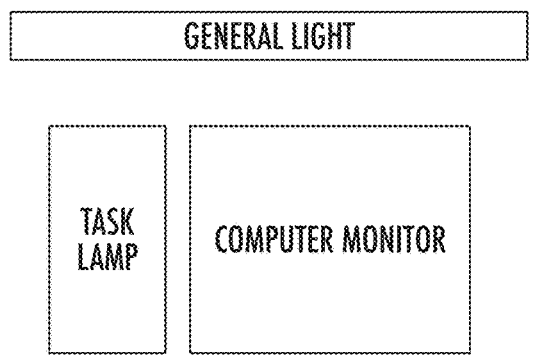
Figure 23D:
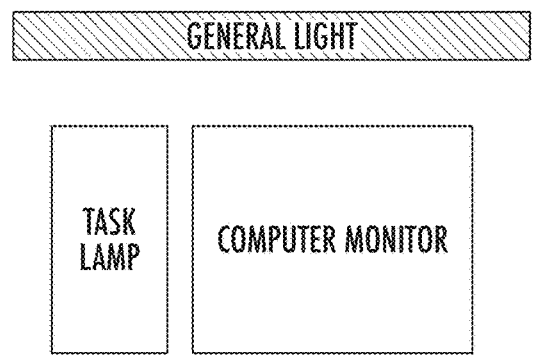

The LEDs utilized in the present lighting devices may emit various wavelengths of biological light. In one example, the BIOS Supp LED (FIG. 21) may emit a spectrum as shown in FIG. 22, where biological light spectrum 2200 includes wavelength peaks at 490 nm (melanopic light, curve 2210) and 660 nm (sub-dermal stimulation, curve 2220). In some embodiments, one or more of the LEDs in the light apparatus may emit ultraviolet light, such as 370 nm to 410 nm, or near 380 nm. It has been recently been found in the scientific literature that the photoreceptor OPN5 (also known as neuropsin), which has a peak absorption at 380 nm, plays a role in photoentrainment. OPN5 has also been shown to accelerate circadian shifting to a new time zone, further indicating the importance of not only a visually purple twilight, but one that also contains wavelengths near 380 nm to 420 nm. In some embodiments, dimming profiles of the present disclosure can include modulating the OPN5/OPN4 ratio as well as creating a purple color. The OPN5/OPN4 ratio is a ratio of an OPN5 lux to a melanopic lux, where OPN4 lux is for melanopic light (480 nm to 500 nm, such as approximately 490 nm) that targets the photoreceptor OPN4, and OPN5 lux is for violet light (380 nm to 410 nm, such as approximately 380 nm) that targets the photoreceptor OPN5.

In some embodiments, the M/P ratio of light emitted from the upper region of the lamp is greater than 1.3, such as greater than 1.5. In one example, the M/P ratio for 17,000 K light emitted from the upper region is 1.7. In some embodiments, the M/P ratio of the total light emitted from the full light apparatus (i.e., light from both the upper and lower regions combined) is greater than 1.3. For example, a light apparatus emitting 7000 K may have an M/P ratio of 1.35. These high M/P ratios are critical to provide high enough melanopic lux, while still keeping glare down. In some embodiments, the luminance emitted by the lamp is at most 3000 candelas/m$^2$, such as less than 2000 cd/m$^2$, such as approximately 1000 cd/m$^2$.

Spectral modulation of the present color separation lighting devices may be beneficial for different population types where ipRGC subtypes may mediate undesired physiological effects. For example, people with migraine headaches, photophobia or bipolar disorder may have an increased sensitivity to blue wavelengths in the range from 450-500 nm. Thus it is beneficial to have the capability—as can be performed with the lighting apparatuses of the present disclosure—to limit some of certain types of blue light, such as including 465 nm but removing 490 nm, or vice versa.

In some embodiments, the light apparatus may include dimming profiles to change the spectral output of the upper and/or lower LED boards. For example, melanopic and/or other biological light wavelengths and intensities may be varied in the light device according to the time of day. Embodiments may include a controller that implements dimming profiles and features as described in U.S. Pat. No. 10,420,184 entitled "Bio-Dimming Lighting System," which is hereby incorporated by reference. The dimming profiles can be pre-programmed, user-defined, or scheduled based on chronotype or individual sleep/wake preferences. In some embodiments, the dimming profiles and/or lighting spectra may be customized based on a group of lights and users in a particular area, such as a group of desks within a region of an open plan office. In such embodiments, the lighting profiles may be based on an average (or other calculation) of preferences of the users in the group, where the lighting devices may include electronic connections (e.g., physical or wireless) to update preferences and lighting profiles to each other. In some embodiments, the amount of color separation—that is, the difference in CCT between L1 and L2—may be changed based on the ambient weather conditions. For example, on an overcast day the amount of color separation may be reduced from what would be used for a sunny day.

In some embodiments, the lighting levels emitted from the lamps of the present disclosure may take into consideration the amount of light from the surroundings, such as other light sources (e.g., ceiling or nearby lamps), light from computer monitors, and the natural environmental (e.g., sunlight changing due to time of day and/or weather). The lighting levels could be measured, for example, using light sensors in the vicinity of the lamps and may include hard-wired or wireless connections (e.g., Bluetooth®) to communicate the lighting measurements to the lamp.

Some embodiments, such as the multi-light source apparatus shown in FIG. 19 described previously, may include enhanced light characteristics projected in three different directions—an uplight (L1), side light (L1b and L2b), and down light (L2). In such embodiments, the side light is white light broken down into two subsets. These subsets enable more red and yellow to be combined within the downward portion in sunrise and sunset modes. One additional benefit of this approach is that a true downlight only portion can be created after a sunset scene has been executed, but before a sunrise scene in effort to put less light into the eyes of the end user.

Studies have shown that the dynamic change of light is imperative for maintaining alertness and attention, similar to what occurs naturally outside with cloud coverage. Some embodiments can implement color separation but can also modulate the color separation to be removed along with reducing intensity over time, similar to cloud cover. This simulation of a daytime cloudy scene can be performed either randomly or in conjunction with information about the weather outside. This information about cloud coverage can be obtained, for example, via an internet connection or via a sensor placed outdoors.

Evidence points to the fact that the suprachiasmatic nucleus (SCN), which contains the master circadian clock, has capacity for color representation. These data suggest that this color representation is specifically looking for color transitions to more blue or purple and yellow or red colors. This data suggests that twilight, which contains even higher contrasted color separation, may contain key biological information to the SCN that encoded information about the beginning and end of the day period. This may be of particular importance for seasonal encoding and circadian amplitude, as the SCN has the capacity to entrain to long and short days. These twilight type responses have been demonstrated in crepuscular creatures. Consequently, some embodiments of the present disclosure may beneficially be configured as a color separated lighting device to modulate the spectrum of the bluish color representing sky (first region) toward an even bluer or purplish color (e.g., wavelength having a peak in the 370 nm to 410 nm range, such as 380 nm), while the white light below the horizon (second region) can modulate to a more yellow or red color, creating a higher color contrast while simultaneously modulating intensity. Thus, embodiments may include coordinating spatial variations and time variations of emitted spectrums with each other to beneficially regulate human circadian behavior with the natural day or to a desired daily schedule (e.g., night shift schedule).

Information supplied to the present lighting devices regarding when to begin the day and end the day may be based on solar data, such as an astronomical clock, or may come as a result of social requirements, habitual or preferred sleep and wake time, or may be a hybrid of all of these. An astronomical clock example would execute a sunrise when a natural sunrise occurs, if the lighting device is on, and execute a sunset when a natural sunset occurs, if the lighting device is on. A social requirement example would be an office work schedule from 9 AM to 6 PM, which would instruct a lighting device such that a sunrise occurs each day around 9 AM, and a sunset occurs each day around 6 PM. A hybrid example would be a scenario in which office work hours may be 9 AM to 6 PM in a region with a large geographical latitude. This means that during the summer, the natural daytime hours would start before 9 AM and end after 6 PM. In this case, a sunrise and sunset would not occur during the work hours. In the winter a natural sunrise would occur before 9 AM, and a natural sunset would occur before 6 PM. In this wintertime case, the controller would implement a dimming profile in which the lighting device would execute no sunrise at 9 AM, but would execute a sunset at 6 PM, thus only extending the daylength, but never shortening the daylength. This may prove useful as data suggest that humans have better memory consolidation during long days compared to short days.

The data on social requirements may be derived, for example, via a local occupancy sensor, or based on BLUETOOTH® connectivity timing, or can be manually inputted via an end user. If multiple end users connect to the device in a shared space setting, the controller for the lighting apparatus may pool all individual data and obtain average or median daylengths. Additionally, if a lighting device is located in the home, some embodiments may include the ability to either execute a sunrise when the natural sunrise occurs or to create a natural sunrise at preferred wakeup time. Conversely, the lighting device can execute a sunset when the natural sun sets or during a time period (e.g., 2-3 hours) prior to preferred bedtime.

In other embodiments, the lighting apparatus may know that user owns multiple lighting devices, such as at work and at home, and interact with the other lighting devices based on an understanding that the opportunity to provide biological signals may extend beyond the intended application. For example, a lighting device at the user's workplace may want (e.g., through learning by the controller) to execute a sunset at a habitual end of worktime of the user. However, if the lighting device knows the end user has an additional lighting device at home, it may then choose to not execute sunset at the workplace, allowing the end user to get exposure to that sunset when they get home. In all cases, after the natural sunset occurs, the controller of the lighting device at the location of the end user may cause the first LED spectrum (L1) located above the horizon to be either purple or completely dark, while the second LED spectrum (L2) is converted to a nighttime friendly light of between 1800 K to 2500 K with peak blue emission from 430 nm to 450 nm.

In some embodiments, lighting apparatuses include a controller in communication with the first light engine and the second light engine. The controller implements a dimming profile according to a time of day, where the dimming profile comprises a sunrise scene, a daytime scene, daytime cloudy scene, a sunset scene, and a nighttime scene; or the dimming profile includes at least one of these scenes. In some embodiments, the lighting apparatus is configured to produce a sunrise scene, where during the sunrise scene an overall light output (i.e., integrated or total or combined light) from the lighting apparatus increases in intensity over time, and an OPN5/OPN4 ratio of the overall light output as received by a user at the user's location is inversely proportional to the intensity. In some embodiments, the lighting apparatus is configured to produce a sunset scene, where during the sunset scene an overall light output from the lighting apparatus decreases in intensity over time and an OPN5/OPN4 ratio of the overall light output as received by a user at the user's location is inversely proportional to the intensity. In some embodiments, the lighting apparatus is configured to produce a nighttime scene, where during the nighttime scene an integrated spectrum from the lighting apparatus as received by a user at the user's location has a nighttime CCT of 1800 K to 2500 K with nighttime blue emission peak between 430 nm to 450 nm. In some embodiments, the lighting apparatus is configured to produce a daytime scene, where during the daytime scene the first CCT of the first light engine is greater than 6500 K with first blue emission peak between 450 nm to 480 nm, and the second CCT of the second light engine is less than 6500 K. In some embodiments, an integrated spectrum from the lighting apparatus during the daytime scene has an M/P ratio greater than 1, as received by a user at the user's location. In some embodiments, an integrated spectrum from the lighting apparatus during the daytime scene, as received by a user at the user's location, has a daytime CCT of greater than 5000 K. In some embodiments, the lighting apparatus is configured to produce a daytime cloudy scene, where during the daytime cloudy scene first CCT and the second CCT are both between 4000 K to 6500 K.

User Response Testing

The vertical illuminance produced by the color separation lamps of the present disclosure provide functional benefits of not only circadian strength but also visual acuity, and furthermore provide unexpected aesthetic acceptability by users. These benefits and user acceptances shall be described in terms of pupillometry test results, glare response, and preference testing that were performed in relation to this disclosure.

Figure 24:
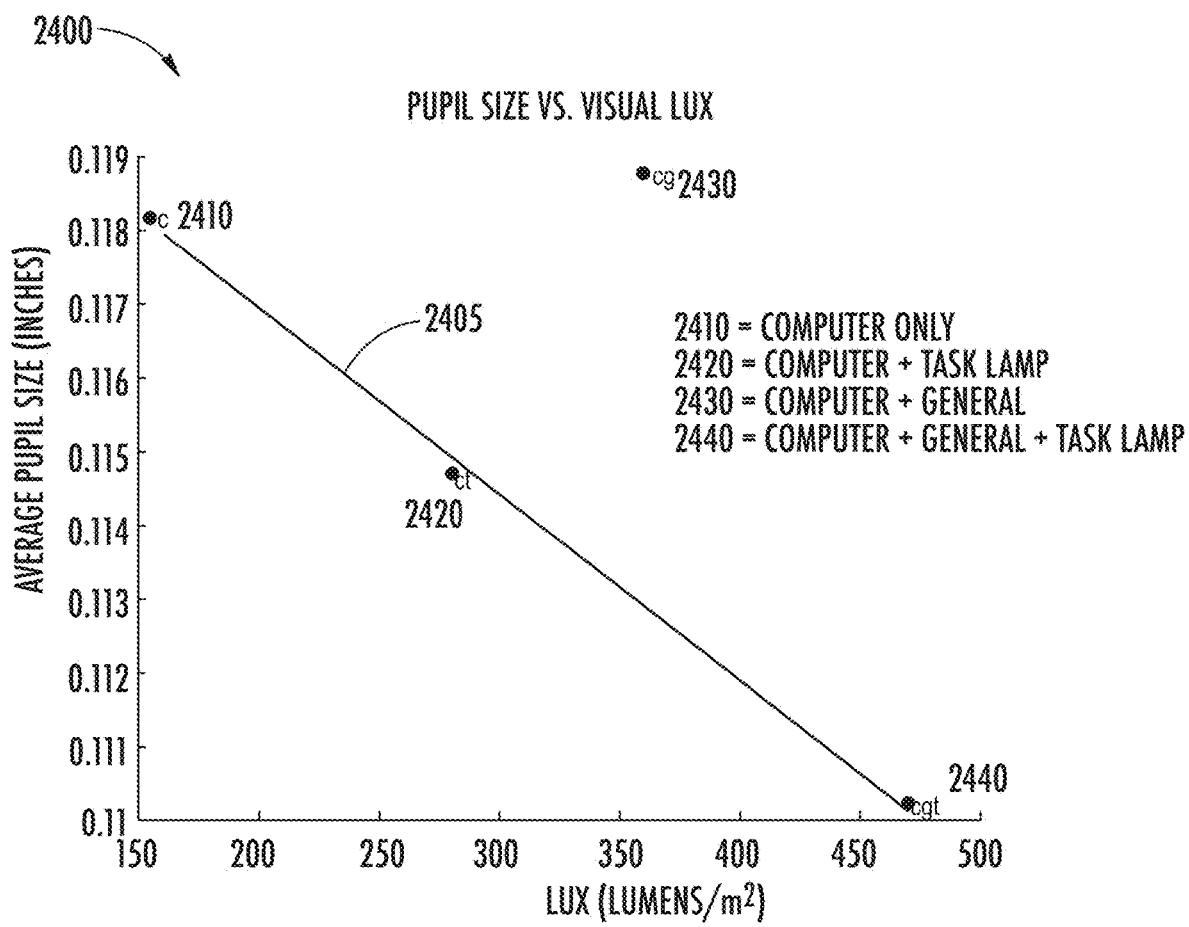
FIG. 24 is a graph of pupil size versus visual lux, in accordance with some embodiments.
Figure 25:
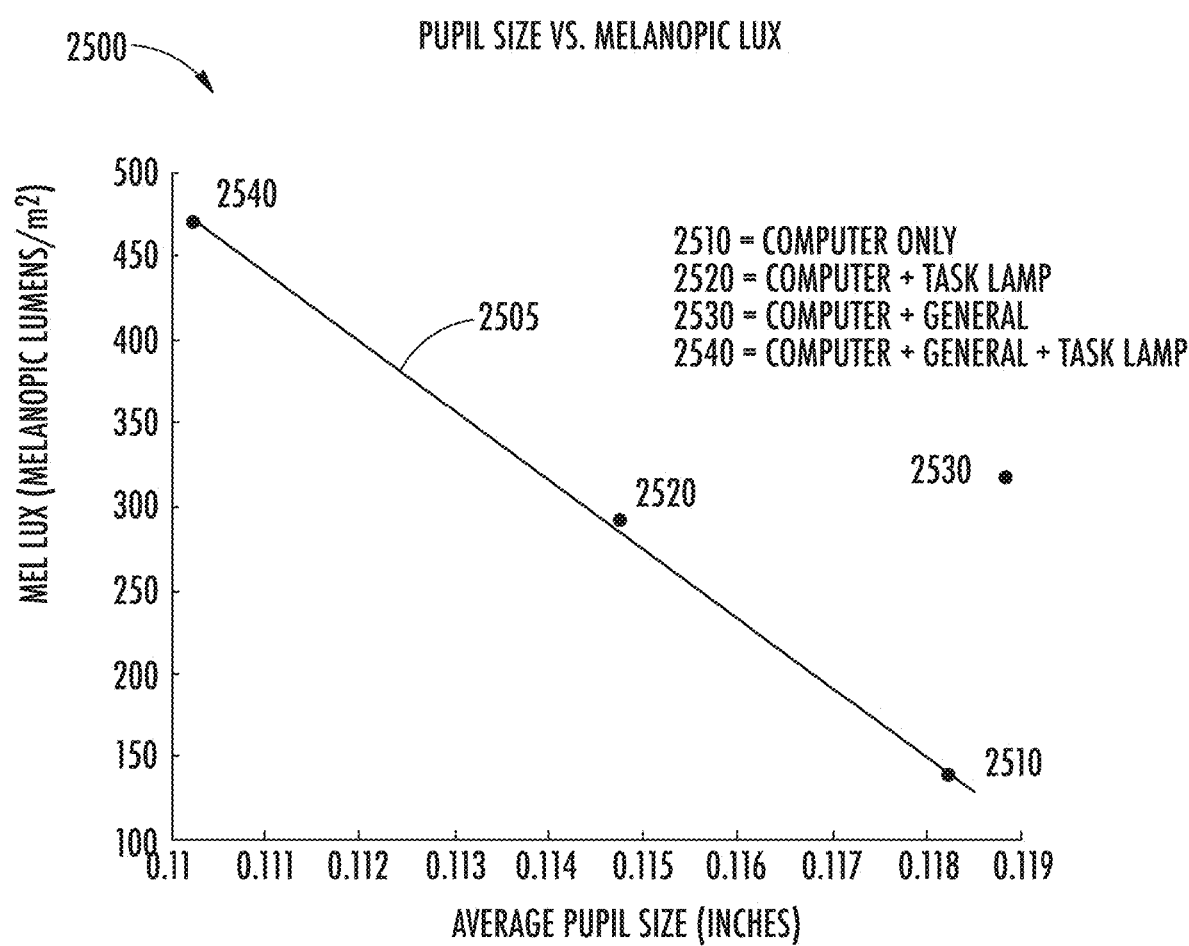
FIG. 25 is a graph of pupil size versus melanopic lux, in accordance with some embodiments.

FIGS. 23-25 shall be used to describe pupillometry testing. It is known that pupil size drives visual acuity, where smaller pupils lead to higher visual acuity. An additional property of smaller pupil size is an understanding that non-visual responses driven by ipRGCs, includes circadian entrainment and pupil size. Thus, pupil size is understood as a correlate to circadian strength, where a stronger circadian strength leads to smaller pupil size. FIGS. 23A-23D describe example lighting scenarios in an office or workspace which can affect pupil size. In these schematics, drawn in vertical cross-section, the variables in the office are a general light, a computer monitor and a task lamp. The general light is typically a ceiling light, while the task lamp and computer monitor are on a desk or table and are near the level of the user's face. In FIG. 23A only the computer is on; in FIG. 23B both the computer and general light are on; in FIG. 23C the computer, task lamp and general light are on; and in FIG. 23D the computer and task lamp are on.

FIG. 24 shows a graph 2400 of average pupil size versus visual lux for the scenarios of FIGS. 23A-23D. The downward slope of the line 2405 from the "computer only" scenario 2410 to the "computer+task lamp" scenario 2420 to the "computer+general light+task lamp" scenario 2440 suggests that task lamps impact pupil size. That is, adding light from a task lamp decreases pupil size, which consequently can improve visual acuity. Thus, the present task lamps can provide both circadian entrainment as well as assist in visual acuity during use. The outlying point representing "computer+general light" scenario 2430 suggests that general illumination does not significantly impact pupil size.

FIG. 25 is a graph 2500 of average pupil size versus melanopic lux measured at the eye for the scenarios of FIGS. 23A-23D. A linear trend is seen related to the task lamp, with melanopic lux increasing (moving upward along the line 2505 from point 2520) with addition of the task lamp (point 2520) and with addition of the general light in combination with the task lamp (point 2540). That is, more melanopic lux was received as pupil size decreased, showing that the task lamp results in more effective circadian benefit and visual acuity.

Figure 26A:
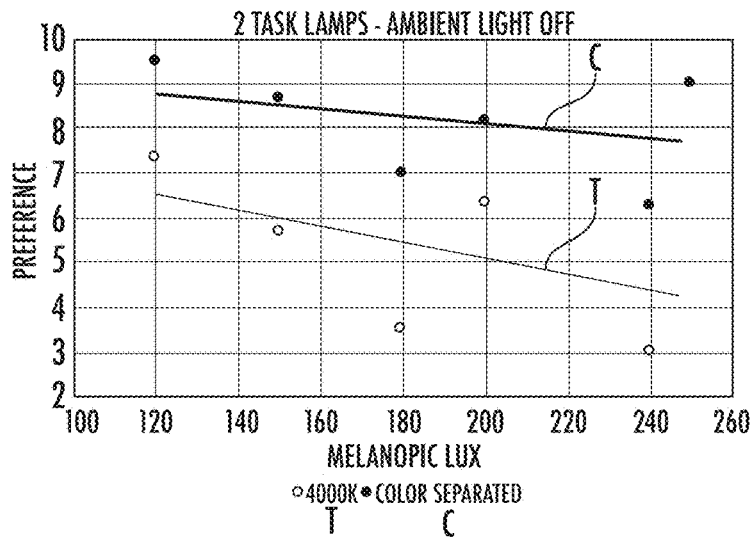
FIGS. 26A-26C are graphs of user preference of color-separated light compared to non-color-separated light as a function of melanopic lux, in accordance with some embodiments.
Figure 26B:
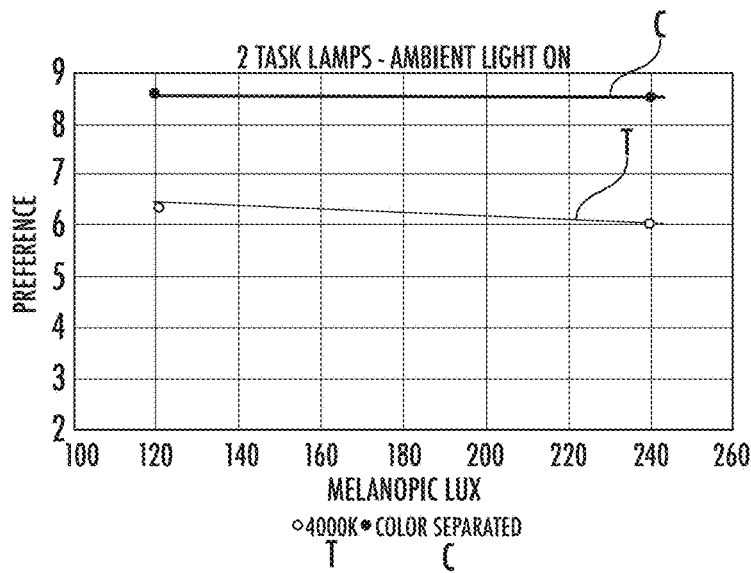
Figure 26C:
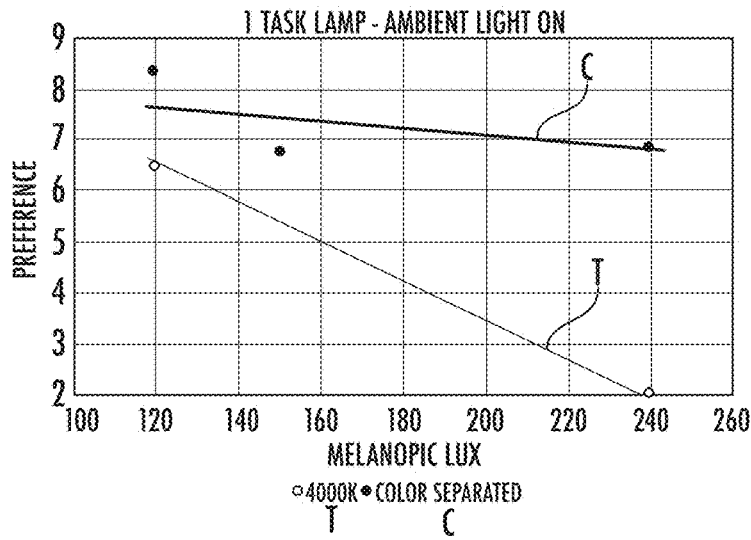

Preference testing was also performed in relation to this disclosure, comparing two identical tasks lamps (similar to that shown in FIG. 13)—one task lamp emitting light only with a CCT of 4000 K and the other emitting color-separated light with CCTs of 4000 K and 17,000 K. Graphs showing user preference as a function of melanopic lux are shown in FIGS. 26A-26C, comparing the 4000 K versus the color-separated lamp. FIG. 26A is a scenario with two of the tested task lamps on and the ambient light off; FIG. 26B is a scenario with two of the tested task lamps on and the ambient light on; and FIG. 26C is a scenario with one test task lamp on and the ambient light on. For each graph, estimated trendlines are plotted for the color separated task lamp (line C) and the 4000 K task lamp (line T). It can be seen that the color separated task lamp received higher preference scores than the 4000 K task lamp; that is, the overall preference from test subjects was for the bluer light sources. The graphs, particularly FIG. 26C, also show that there was a sharper decline in preference as brightness increased for the white light (4000 K lamp) compared to the color separated light. These preference testing graphs show the surprising results that although the present task lamps have more blue content (which traditionally results in more glare), they were aesthetically more acceptable by users.

Figure 27A:
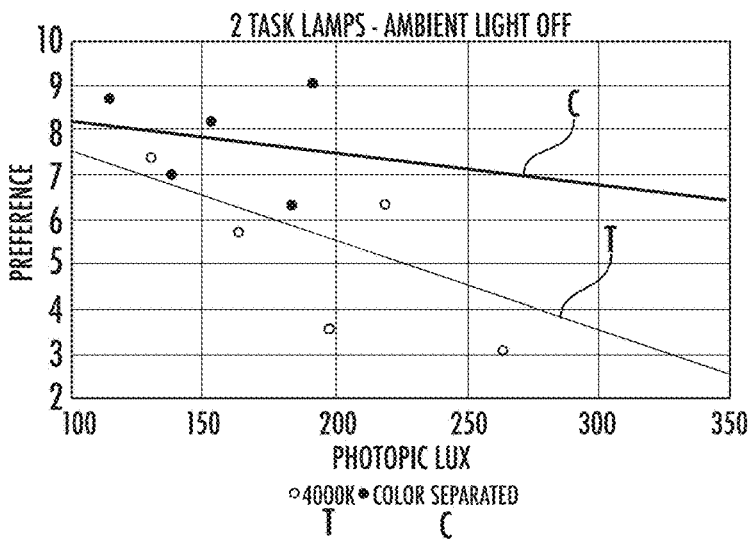
FIGS. 27A-27C are graphs of user preference of color-separated light compared to non-color-separated light as a function of photopic lux, in accordance with some embodiments.
Figure 27B:
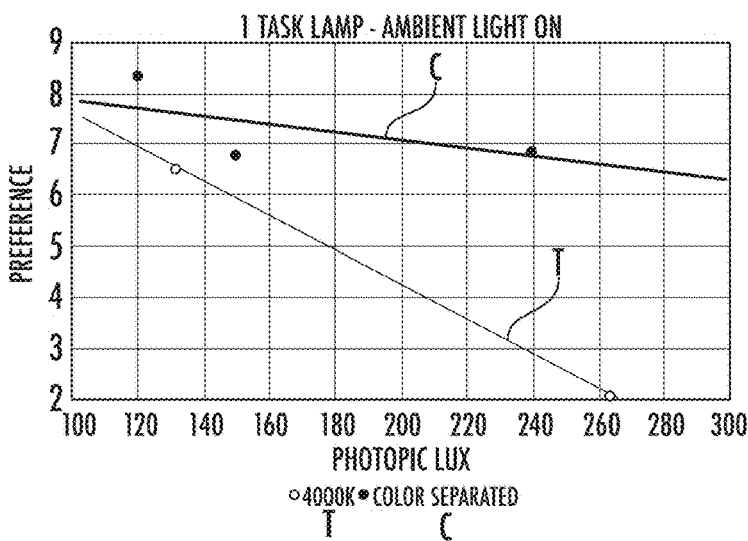
Figure 27C:
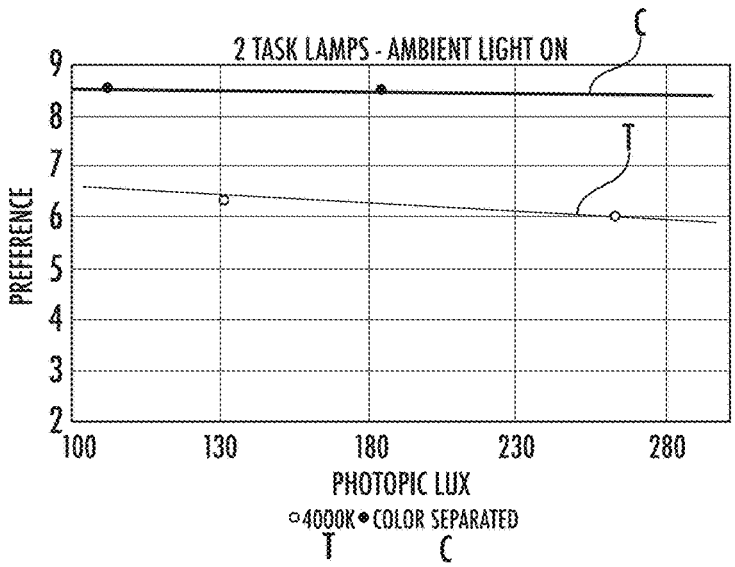

FIGS. 27A-27C are graphs that are similar to FIGS. 26A-26C but show preferences as a function of photopic lux. The lines labeled "C" representing color-separated data are higher than the lines labeled "T" representing 4000 K light, showing again that users preferred the color-separated light. The graphs of FIGS. 27A-27C also demonstrate that the color-separated light had visual brightness levels similar to the 4000 K light, indicating that the increased comfort is not due to a higher M/P ratio of the color-separated light compared to the 4000 K light but rather was due to the color separation of the light.

Reference has been made to embodiments of the disclosed invention. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. A lighting apparatus comprising:
   a first light engine that produces a first light spectrum having a first correlated color temperature (CCT) greater than or equal to 17,000 K;
   a second light engine that produces a second light spectrum having a second CCT less than or equal to 6500 K; and
   an enclosure around the first light engine and the second light engine, the enclosure having an optical diffuser, wherein the optical diffuser is positioned over a first region, a second region and a third region of the enclosure;
   wherein:
   the first region and the second region are separated by the third region;
   the first light spectrum is primarily emitted from the first region of the enclosure;
   the second light spectrum is primarily emitted from the second region of the enclosure;
   a mixture of the first light spectrum and the second light spectrum is emitted from the third region of the enclosure;
   a primary viewing area of a user is adjacent or below the third region in an installation orientation of the lighting apparatus; and
   a total melanopic to photopic ratio (M/P ratio) emitted by the lighting apparatus and received by the user is greater than 1.0.

2. The lighting apparatus of claim 1 wherein the first region is vertically above the second region, relative to ground, in the installation orientation of the lighting apparatus.

3. The lighting apparatus of claim 1 wherein in the installation orientation of the lighting apparatus, the first light spectrum is emitted upward relative to ground, the mixture is emitted in a horizontal direction, and the second light spectrum is emitted downward relative the ground.

4. The lighting apparatus of claim 1 wherein:
   the first light engine emits a first blue emission peak in a first wavelength range of 450 nm to 480 nm; and
   the second light engine emits a second blue emission peak in a second wavelength range of 480 nm to 500 nm.

5. The lighting apparatus of claim 1 wherein the second CCT is 4000 K to 5000 K.

6. The lighting apparatus of claim 1 wherein the first light spectrum has an M/P ratio greater than or equal to 1.7.

7. The lighting apparatus of claim 1 wherein the mixture emitted from the third region has a third CCT profile comprising a gradient from the first CCT to the second CCT.

8. The lighting apparatus of claim 1 wherein a first light emitting diode (LED) of the first light engine and a second LED of the second light engine face each other and are near opposite ends of the lighting apparatus.

9. The lighting apparatus of claim 1 wherein the optical diffuser is a continuous piece covering the first region, the second region and the third region.

10. The lighting apparatus of claim 1 wherein:
   the optical diffuser comprises a translucent material; and
   at least one of the first light spectrum and the second light spectrum partially reflects off an interior surface of the optical diffuser.

11. A lighting apparatus comprising:
a first light engine that produces a first light spectrum having a first correlated color temperature (CCT) greater than or equal to 3500 K;
a second light engine that produces a second light spectrum having a second CCT less than or equal to 6500 K, wherein the second CCT is less than the first CCT and a difference between the first CCT and the second CCT is at least 10,000 K; and
an enclosure around the first light engine and the second light engine, the enclosure having an optical diffuser, wherein the optical diffuser is positioned over a first region, a second region and a third region of the enclosure;
wherein:
the first region and the second region are separated by the third region;
the first light spectrum is primarily emitted from the first region of the enclosure;
the second light spectrum is primarily emitted from the second region of the enclosure;
a mixture of the first light spectrum and the second light spectrum is emitted from the third region of the enclosure;
a primary viewing area of a user is adjacent or below the third region in an installation orientation of the lighting apparatus; and
a total melanopic to photopic ratio (M/P ratio) emitted by the lighting apparatus and received by the user is greater than 1.0.

12. The lighting apparatus of claim 11 further comprising a controller in communication with the first light engine and the second light engine, wherein the controller implements a dimming profile according to a time of day, wherein the dimming profile comprises a sunrise scene, a daytime scene, daytime cloudy scene, a sunset scene, and a nighttime scene.

13. The lighting apparatus of claim 11 wherein:
the lighting apparatus is further configured to produce a sunrise scene;
during the sunrise scene an overall light output from the lighting apparatus increases in intensity over time; and
an OPN5/OPN4 ratio of the overall light output, as received by the user at the user's location, is inversely proportional to the intensity of the overall light output, wherein the OPN5/OPN4 ratio is a ratio of 380 nm to 410 nm violet light that stimulates OPN5 in the user, to 480 nm to 500 nm melanopic light that stimulates OPN4 in the user.

14. The lighting apparatus of claim 11 wherein:
the lighting apparatus is further configured to produce a sunset scene;
during the sunset scene an overall light output from the lighting apparatus decreases in intensity over time; and
an OPN5/OPN4 ratio of the overall light output, as received by the user at the user's location, is inversely proportional to the intensity of the overall light output, wherein the OPN5/OPN4 ratio is a ratio of 380 nm to 410 nm violet light that stimulates OPN5 in the user, to 480 nm to 500 nm melanopic light that stimulates OPN4 in the user.

15. The lighting apparatus of claim 11 wherein:
the lighting apparatus is further configured to produce a nighttime scene; and
during the nighttime scene an integrated spectrum from the lighting apparatus, as received by the user at the user's location, has a nighttime CCT of 1800 K to 2500 K with a nighttime blue emission peak between 430 nm to 450 nm.

16. The lighting apparatus of claim 11 wherein:
the lighting apparatus is further configured to produce a daytime scene; and
during the daytime scene the first CCT of the first light engine is greater than 6500 K and has a first blue emission peak between 450 nm to 480 nm, and the second CCT of the second light engine is less than 6500 K.

17. The lighting apparatus of claim 16 wherein the total M/P ratio of an integrated spectrum from the lighting apparatus during the daytime scene is greater than 1, as received by the user at the user's location.

18. The lighting apparatus of claim 16 wherein an integrated spectrum from the lighting apparatus during the daytime scene, as received by the user at the user's location, has a daytime CCT of greater than 5000 K.

19. The lighting apparatus of claim 11 wherein:
the lighting apparatus is further configured to produce a daytime cloudy scene; and
during the daytime cloudy scene the first CCT and the second CCT are both between 4000 K to 6500 K.

20. A lighting apparatus comprising:
a first light engine that produces a first light spectrum having a first color in a first area bounded by chromaticity coordinates (x,y) of (0.11, 0.1), (0.16, 0.004), (0.255, 0.33), (0.32, 0.325) in a CIE 1931 color space diagram using 10-degree color matching functions, the first color having a first correlated color temperature (CCT);
a second light engine that produces a second light spectrum having a second color in a second area bounded by chromaticity coordinates of (0.55, 0.44), (0.691, 0.311), (0.417, 0.45), (0.35, 0.35) in the CIE 1931 color space diagram using 10-degree color matching functions, the second color having a second CCT, wherein a difference between the first CCT and the second CCT is at least 10,000 K; and
an enclosure around the first light engine and the second light engine, the enclosure having an optical diffuser, wherein the optical diffuser is positioned over a first region, a second region and a third region of the enclosure;
wherein:
the first region and the second region are separated by the third region;
the first light spectrum is primarily emitted from the first region of the enclosure;
the second light spectrum is primarily emitted from the second region of the enclosure;
a mixture of the first light spectrum and the second light spectrum is emitted from the third region of the enclosure;
a primary viewing area of a user is adjacent or below the third region in an installation orientation of the lighting apparatus; and
a total melanopic to photopic ratio (M/P ratio) emitted by the lighting apparatus and received by the user is greater than 1.0.

21. The lighting apparatus of claim 20 wherein the first region is vertically above the second region, relative to ground, in the installation orientation of the lighting apparatus.

22. The lighting apparatus of claim 20 wherein:
the first light engine emits a first blue emission peak in a first wavelength range of 450 nm to 480 nm; and
the second light engine emits a second blue emission peak in a second wavelength range of 480 nm to 500 nm.

23. The lighting apparatus of claim 20 wherein the mixture emitted from the third region has a third CCT profile comprising a gradient from the first CCT to the second CCT.

24. The lighting apparatus of claim 20 wherein the optical diffuser is a continuous piece covering the first region, the second region and the third region.

* * * * *